(12) United States Patent
Landa et al.

(10) Patent No.: US 12,397,573 B2
(45) Date of Patent: *Aug. 26, 2025

(54) THERMAL TRANSFER PRINTING

(71) Applicant: LANDA LABS (2012) LTD, Rehovot (IL)

(72) Inventors: Benzion Landa, Nes Ziona (IL); Sagi Abramovich, Ra'anana (IL); Amit Haviv, Petach Tikva (IL); Ofer Aknin, Petach Tikva (IL); Yaakov Valdman, Rehovot (IL); Michael Nagler, Tel Aviv (IL)

(73) Assignee: Landa Labs (2012) LTD., Rehovot (IL)

( * ) Notice: Subject to any disclaimer, the term of this patent is extended or adjusted under 35 U.S.C. 154(b) by 864 days.

This patent is subject to a terminal disclaimer.

(21) Appl. No.: 17/673,179

(22) Filed: Feb. 16, 2022

(65) Prior Publication Data

US 2022/0169059 A1    Jun. 2, 2022

Related U.S. Application Data

(60) Continuation-in-part of application No. 17/386,383, filed on Jul. 27, 2021, now Pat. No. 11,642,905,
(Continued)

(30) Foreign Application Priority Data

Nov. 30, 2016 (WO) .................. PCT/IB2016/057226

(51) Int. Cl.
*B41M 5/025* (2006.01)
*B41J 2/005* (2006.01)
(Continued)

(52) U.S. Cl.
CPC ............ *B41M 5/025* (2013.01); *B41J 2/0057* (2013.01); *B41J 2/447* (2013.01); *B41M 5/0256* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 11,745,496 B2 * 9/2023 Landa ................. B05B 14/30
347/101
2002/0000190 A1 * 1/2002 Neuhaus ................ B41M 1/10
118/231
(Continued)

*Primary Examiner* — Manish S Shah
(74) *Attorney, Agent, or Firm* — Shalom Wertsberger; Saltamar Innovations

(57) ABSTRACT

A printing assembly for thermal transfer printing is disclosed. The assembly comprises at least one first printing system comprising a transfer member having an imaging surface on the front side, a coating station at which a monolayer of thermoplastic particles is applied to the imaging surface, an imaging station at which electromagnetic radiation (EM) is applied, optionally via the rear side of the transfer member, to selected regions of the imaging surface to render the particles coating the selected regions tacky, a transfer station at which only the regions of the particles coating that have been rendered tacky are transferred to a substrate to form an adhesive image; and at least one more downstream printing system. The transfer member includes on its front side an EM radiation absorbing layer, the imaging surface being formed on, or as part of, the absorbing layer, and on its rear side a body which can optionally be transparent to EM radiation.

20 Claims, 8 Drawing Sheets

Related U.S. Application Data which is a division of application No. 16/425,559, filed on May 29, 2019, now Pat. No. 11,104,779, which is a continuation-in-part of application No. PCT/IB2017/057535, filed on Nov. 30, 2017.

(51) Int. Cl.

| | | |
|---|---|---|
| *B41J 2/447* | (2006.01) | |
| *B41J 2/45* | (2006.01) | |
| *B41M 5/03* | (2006.01) | |
| *B41M 5/52* | (2006.01) | |
| *G03G 15/32* | (2006.01) | |
| *G03G 15/34* | (2006.01) | |

(52) U.S. Cl.
CPC ............... *B41M 5/03* (2013.01); *B41M 5/52* (2013.01); *G03G 15/342* (2013.01); *B41J 2/45* (2013.01); *B41M 2205/06* (2013.01); *B41M 2205/10* (2013.01); *G03G 15/321* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | | |
|---|---|---|---|---|
| 2003/0067529 | A1* | 4/2003 | May | B41M 5/0256 347/103 |
| 2004/0046860 | A1* | 3/2004 | Beier | B41C 1/05 347/238 |
| 2010/0075843 | A1* | 3/2010 | Ikuno | B41M 3/12 347/100 |
| 2012/0103212 | A1* | 5/2012 | Stowe | B41F 31/045 101/147 |
| 2014/0026771 | A1* | 1/2014 | Schlumm | G03G 21/203 101/350.5 |
| 2015/0352836 | A1* | 12/2015 | Kanasugi | B41J 2/01 347/103 |
| 2016/0176185 | A1* | 6/2016 | Kanungo | B41J 2/01 347/103 |
| 2019/0322099 | A1* | 10/2019 | Landa | B41M 5/03 |

* cited by examiner

THERMAL TRANSFER PRINTING

CROSS-REFERENCE TO RELATED APPLICATIONS

This application is a continuation-in-part of U.S. application Ser. No. 17/386,383 filed on Jul. 27, 2021, which is a divisional of U.S. patent application Ser. No. 16/425,559, filed on May 29, 2019, which is in turn a continuation-in-part of PCT/IB2017/057535, filed on Nov. 30, 2017, which claims Paris Convention priority from PCT/IB2016/057226, filed on Nov. 30, 2016. The contents of all the above applications are incorporated by reference in their entirety as if fully set forth herein.

FIELD

The present disclosure relates to a method and system for printing on a surface of a substrate with a film of a thermoplastic material.

BACKGROUND

The present disclosure is a development of the teachings of PCT/IB2016/053139 to the same Applicant which was published as WO2016/189512 on 1 Dec. 2016 and has a priority date of 27 May 2015. To avoid unnecessary repetition, the PCT/IB2016/053139 application is incorporated herein by reference in its entirety and reference will be made throughout the present disclosure to the latter publication.

Thermal transfer printers are known that employ a ribbon carrying a polymeric ink film. The ribbon is equivalent to the ink ribbon used in a conventional typewriter, but the ink is solid ink and is transferred from it onto a substrate (usually paper) not by impact but by means of a thermal print head that heats only the regions of the ribbon from which the ink is to be transferred to the paper. Thermal transfer printers can print in monochrome or in full color, by transferring images successively from colored ribbons.

Such printers achieve printing of high quality but are wasteful, and therefore costly to operate, since the ribbon is generally single-use and when discarded, much of its ink surface has not been transferred to a printing substrate.

WO2016/189512 discloses a printing system and method that operate on the same principle as thermal transfer printers, but in which the single-use ribbon is replaced by a transfer member which, rather than carrying a polymeric ink film, is coated with a layer of thermoplastic or thermoplastic-coated particles, which can be replenished after each transfer cycle, enabling the transfer member to perform multiple printing cycles, significantly reducing waste.

In particular, WO2016/189512 discloses inter alia a method of thermal transfer printing onto a surface of a substrate, which method comprises the steps of:

a) providing a transfer member having front and rear sides with an imaging surface on the front side, b) coating the imaging surface of the transfer member with individual particles formed of, or coated with, a thermoplastic polymer, c) removing substantially all particles that are not in direct contact with the imaging surface to leave a uniform monolayer particle coating on the imaging surface, d) applying radiation to selected regions of the coated imaging surface to heat and render tacky the particles within the selected regions, and e) pressing at least a portion of the coated imaging surface and at least a corresponding portion of the substrate surface against one another, to cause transfer to the surface of the substrate of only the regions of the particle coating that have been rendered tacky.

To permit continuous printing, following transfer of particles from the selected regions to a first substrate surface, steps b) and c) may be repeated to apply a fresh monolayer coating of particles at least to the selected regions from which the previously applied monolayer coating was transferred to the substrate surface in step e), so as to leave the imaging surface again uniformly coated with a monolayer of particles for printing onto a subsequent substrate surface, as described in steps d) and e). In other words, for printing of subsequent images (which need not be identical from cycle to cycle), steps b) to e) can be sequentially repeated.

WO2016/189512 suggested pressing the coated imaging surface and the substrate surface against one another during application of radiation. This requires the radiation to the applied to the rear side of the transfer member. In practice this mode of operation has been found to be the more preferable but WO2016/189512 does not provide a clear teaching as to how efficient irradiation from the rear side of the transfer member can be achieved.

SUMMARY

In accordance with a first aspect of the present disclosure, there is provided a printing system for thermal transfer printing onto a surface of a substrate, the system comprising:

a) a movable transfer member having opposite front and rear sides with an imaging surface on the front side, b) a coating station adapted to apply a monolayer of particles made of, or coated with, a thermoplastic polymer to the imaging surface or at least a segment thereof, c) an imaging station adapted to apply energy in the form of electromagnetic (EM) radiation via the rear side of the transfer member to selected regions of the particles coated imaging surface to render the particles thereon tacky within the selected regions, and d) a transfer station adapted to press the imaging surface and the surface of the substrate, or respective segments thereof, against one another to cause transfer to the surface of the substrate of only the regions of the particle coating that have been rendered tacky, wherein (e) the rear side of the transfer member is formed of a body transparent to the EM radiation, and (f) an EM radiation absorbing layer made of an elastomeric silicone is provided on the front side of the transfer member adjoining the transparent body, the imaging surface being formed on, or as part of, the radiation absorbing layer.

In accordance with a second aspect of the present disclosure, there is provided a printing system for thermal transfer printing onto a surface of a substrate, the system comprising:

a) a movable transfer member having opposite front and rear sides with an imaging surface on the front side, b) a coating station adapted to apply a monolayer of particles made of, or coated with, a thermoplastic polymer to the imaging surface or at least a segment thereof, c) an imaging station adapted to apply energy in the form of electromagnetic (EM) radiation via the rear side of the transfer member to selected regions of the particles coated imaging surface to render the particles thereon tacky within the selected regions, and d) a transfer station adapted to press the imaging surface and the surface of the substrate, or respective segments thereof, against one another to cause transfer to the surface of the substrate of only the regions of the particle coating that have been rendered tacky, wherein an EM radiation absorbing layer is provided on the front side of the transfer member, the radiation absorbing layer adjoining a body, transparent to the EM radiation, on the rear side of the transfer member, the imaging surface being formed on, or as part of, the radiation absorbing layer; and wherein the transfer member satisfies at least one, at least two or at least three or more of the following structural features:

i) the radiation absorbing layer is made of an elastomeric silicone;
ii) the transparent body is made of an elastomeric silicone;
iii) the transfer member is substantially non-compressible;
iv) the radiation absorbing layer comprises sub-micron carbon black particles dispersed in an elastomeric silicone;
v) the sub-micron carbon black particles have an average primary particle size (Dv50) of at most 100 nm;
vi) the sub-micron carbon black particles have a predominant cluster size (Dv90) of at most 500 nm;
vii) the radiation absorbing layer has an absorbance of at least 0.14 μm, the absorption being measured at a wavelength of said EM radiation or within a proximal range thereof.

In different embodiments, the application of thermoplastic particles so as to form a monolayer of particles on an imaging surface of a transfer member of such printing system may comprise:

directing a fluid or fluid jet carrying the particles onto the imaging surface, rubbing the particles onto the imaging surface using a cloth, brush or an application roller, forming the imaging surface and the surface of the particles of hydrophobic materials and directing a liquid containing the particles onto the imaging surface, the liquid being selected so as not to wet the imaging surface, directing onto an intermediate applicator a gas or liquid jet containing the particles, the applicator being capable of receiving the particles and transferring them to the imaging surface, or any suitable combination of the above-mentioned techniques and structures.

In accordance with a further aspect of the invention, there is provided a method of thermal transfer printing onto a surface of a substrate, which comprises:

a) providing a movable transfer member having opposite front and rear sides with an imaging surface on the front side,
b) applying to the imaging surface a monolayer coating of particles made of, or coated with, a thermoplastic polymer,
c) applying EM radiation via the rear side of the transfer member to selected regions of the coated imaging surface to render the particles thereon tacky within the selected regions, and
d) pressing the imaging surface and the surface of the substrate against one another to cause transfer to the surface of the substrate of only the regions of the particle coating that have been rendered tacky, wherein
(e) forming the rear side of the transfer member of a body transparent to the EM radiation, and
(f) providing a radiation absorbing layer made of an elastomeric silicone on the front side of the transfer member adjoining the transparent body, the imaging surface being formed on, or as part of, the radiation absorbing layer such that the EM radiation reaches the imaging surface by passing through the transparent body.

The terms "tacky" and "sufficiently tacky" as used herein are not intended to mean that the particle coating is necessarily tacky to the touch but only that it is softened sufficiently to enable its adhesion to the surface of a substrate when pressed against it in the transfer station. The tacky particles or regions of particles rendered tacky are believed to form individual films or contiguous films which following their transfer to a printing substrate may optionally yield thinner films, as a result of the pressure being applied upon contacting of the imaging surface (or a segment thereof) to the substrate (or a corresponding segment thereof) and/or of the optional further processing (e.g., fusing, drying, curing, coating, etc.) of the transferred films. Such optional further processing may include heating of the already-transferred images and/or the receiving substrate by means which do not contact the transferred image or by means which contact the transferred images, both of which means are well known in the art. In the case of non-contact heating, such as hot air, radiant heating, radio frequency heating and the like, heating the transferred image may enhance its adhesion to the substrate, its adhesivity towards subsequently applied materials, its abrasion resistance, its chemical resistance and the like. In the case of heating means which contact the image, such as silicone-coated fuser rolls or belts, in addition to the benefits of non-contact heating, the image film may also acquire higher gloss and scratch resistance.

The intended meaning of the term "monolayer" and different ways in which a monolayer can be achieved are disclosed in WO2016/189512 and WO2016/189513 which provide details of the particle size, polymer film thickness as well as the design and construction of an imaging station for emitting laser radiation.

The thermoplastic particles may have a particle size of less than 40 μm, 20 μm, 10 μm, or less than 5 μm, or less than 1 μm, or within the range of 100 nm to 4 μm, or 300 nm to 1 μm, or 500 nm to 1.5 μm.

Particular imaging devices that may serve in such imaging stations are further detailed in WO2016/189510 and WO2016/189511, all foregoing applications to the same Applicant having published on 1 Dec. 2016.

Briefly, in order to facilitate replenishment of the particle coating on the imaging surface after each transfer, particles that adhere to the imaging surface more strongly than they do to one another are utilized. This results in an applied layer that is substantially a monolayer of individual particles, with little, if any, overlap, the thickness of the monolayer being therefore commensurate (e.g., 1-3-times) with the thickness of the particles. Stated differently, the layer is only one particle thick over a major proportion of the area of the imaging surface and most, if not all, of the particles have at least some direct contact with the imaging surface.

Advantageously, a monolayer of particles facilitates the targeted delivery of radiation. This may ease the control of the imaging device, as the selectively irradiated particles reside on a single defined layer, which may facilitate focusing the laser radiation to form upon transfer to a substrate a dot of approximately even thickness and/or relatively defined contour.

Another advantage of having a monolayer is that it can provide for good thermal coupling between the particles and the imaging surface on which the particles are coated.

To permit the printing on the substrate of patterns corresponding to the selected regions exposed to radiation, the affinity of the heated tacky particles needs to be greater to the substrate than to the imaging surface. Moreover, this relatively higher affinity of the tacky particle to the substrate in the selected regions shall also be greater than the affinity of the bare substrate to the particles not rendered tacky. In the present context, a substrate is termed "bare" if lacking any desired image pattern to be printed by the present method or system. Though the bare substrate should for most purposes have substantially no affinity to the thermoplastic particles, to enable the selective affinity of the tacky ones, some residual affinity can be tolerated (e.g., if not visually detectable) or even desired for particular printing effects. Undesired transfer of particles to areas of the bare substrate is also termed parasite or parasitic transfer.

The term "thermoplastic particles" is used to refer to all particles (colored or not) comprising a thermoplastic polymer, whether coating the particle or forming substantially all of the particle, including any intermediate range of presence of the polymer allowing the thermoplastic particles to serve their intended purposes. In the latter cases, wherein the thermoplastic polymer(s) can be homogeneously present in the entire particle, not being particularly restricted to an external coating, the particles may also be said to be made of a thermoplastic polymer. Colored thermoplastic particles may alone, but also in combination, provide a desirable printing effect (e.g., a colored pattern or a part thereof). Uncolored transparent thermoplastic particles not necessarily but typically provide a desirable printing effect when combined with other materials capable of displaying a visually detectable effect. For illustration, transparent particles may form an uncolored under-coat image capable of further adhering to subsequently applied particles (e.g., made of plastics, metals, or any material providing a desirable printing effect) or may form an uncolored over-coat capable of modifying the mechanical or esthetical properties of an image previously formed on the substrate. A transferred image of thermoplastic particles (whether or not colored) that may serve to later adhere different particles thereto may be termed an "adhesive image".

Such gradient of affinities between the particles (before and after heating), the fluid carrying the native particles for coating or replenishing of the transfer member, the imaging surface, the printing substrate, and any such element of the method, can be modulated by selection of suitable materials or characteristics, such as hardness, smoothness, hydrophobicity, hydrophilicity, charge, polarity and any such properties known to affect interaction between any two elements.

For assisting in the transfer of the tacky film of particles from the imaging surface to the substrate, the imaging surface may be hydrophobic.

In some embodiments, the thermoplastic particles may themselves be hydrophobic. In such case, the relative affinity between the particles in their different states and the imaging surface can be based, at least partially, on hydrophobic-hydrophobic interactions. In some embodiments, attachment of the monolayer of particles to the imaging surface is assisted by the relative low hardness of the imaging surface as is further detailed below. A relatively soft imaging surface may assist in forming an intimate contact with each individual particle, such intimate contact manifesting itself in a relatively large contact area between the imaging surface and the particle, in contrast to the discrete contact formed between the particle and a relatively hard surface. Such intimate contact may thus further intensify effects of any short-range attraction forces between the imaging surface and the particles, such as, e.g., hydrophobic-hydrophobic interactions or Van der Waals forces.

In some embodiments, the thermoplastic particles and/or the imaging surface can alternatively or additionally achieve desired relative affinity one to another (and to any other fluid or surface suitable for a printing process according to present teachings) by way of charge-based interactions. For instance, positively charged particles may favor negatively charged surfaces. In such case, the relative affinity between the particles in their different states and the imaging surface can be based on charge-charge interactions.

In some embodiments, the surface of the printing substrate can be treated to favor the transfer of the films of tacky particles. Treatment can be physical (e.g., by corona) or chemical (e.g., the substrate including a suitable external coat).

In accordance with a further aspect of the present invention, there is provided a transfer member for use in a printing system of the present invention, having the form of an endless belt or a drum and comprising a body transparent to electromagnetic (EM) radiation lying within a predetermined range of frequencies disposed on a rear side of the transfer member, a radiation absorbing elastomeric silicone layer opaque to the EM radiation adjoining the transparent body and disposed on or adjacent a front side of the transfer member, and a hydrophobic release layer formed on the front side of the transfer member, the release layer being in thermal contact with, or formed as part of, the radiation absorbing layer.

The transfer member support layer may be a drum or an endless belt, the image surface disposed thereon being continuous (e.g., the belt being a seamless belt) and substantially uniform over its entire surface.

In some embodiments, the radiation absorbing layer may have an absorbance per μm (as measured in the manner set out below) of at least 0.1/μm, the absorption being measured at a wavelength of said EM radiation or within a proximal range thereof. In some embodiments, the absorption may be at least 0.2/μm, or at least 0.3/μm.

Advantageously, the imaging surface is compatible with the radiant energy intermittently applied by the imaging station to heat desired selected areas. By compatible, it is meant for instance, that the imaging surface is relatively resilient and/or inert to the radiation at the irradiated frequency/wavelength range, for example, the transfer member and the imaging surface maintain mechanical characteristics such as strength and flexibility under such radiation. Also, the imaging surface may be able to prevent or minimize heat loss to the transfer member and promoting effective heating to the particles. Additionally, or alternatively, the imaging surface may be able to conduct heat that is generated by the radiation, such conduction being advantageously restricted to the thin layer adjoining the imaging surface.

The carbon black (CB), in some embodiments, has an average primary particle size (Dv50) of at most 100 nm.

The carbon black particles are desirably dispersed within the silicone matrix in such a manner that a predominant measured particle cluster size (Dv90) approximates to one half of the wavelength of the applied radiation. Thus, assuming that IR radiation having a wavelength in the range 700 nm to 1100 nm, is used in the imaging system, the predominant measured cluster size (Dv90) of the CB particles in the radiation absorbing layer preferably does not exceed a value within the range of 350 nm to 550 nm.

The concentration of the carbon black particles within the silicone matrix of the radiation absorbing layer, in some embodiments, is at least 0.01%, by weight of the silicone matrix, and optionally of at most 30 wt. %. In some embodiments, the weight per weight concentration of the carbon black particles within the radiation absorbing layer is between 5% and 30%, between 7.5% and 27.5%, between 10% and 25%, between 12.5% and 25%, between 15% and 25%, or between 15% and 20%. By way of example, the concentration of carbon black particles within the radiation absorbing layer can be approximately 10%, 11%, 12%, 13%, 14%, 15%, 16%, 17%, 18%, 19%, 20%, 21%, 22%, 23%, 24%, or 25% w/w.

In some embodiments, the silicone matrix of the imaging layer, including of the radiation absorbing layer, is an addition-cure silicone matrix.

In some embodiments, the silicone matrix of the imaging layer, including of the radiation absorbing layer, is a condensation-cure silicone matrix.

Addition cured silicone can be identified by the presence of platinum in the cured matrix, platinum being used in the curing process. Condensation cured silicone, on the other hand, can be identified by the presence of tin in the cured matrix.

In some embodiments, the carbon black particles used for the preparation of the radiation absorbing layer are of hydrophilic CB and have at least one, at least two, or at least three of the following structural properties:

A) a volatile matter content of at least 1.5%, by weight of the carbon black particles, or at least 2.5%, at least 3.5%, at least 5%, at least 8%, at least 10%, at least 12%, at least 15%, or at least 18%, and optionally, at most 50%, at most 35%, at most 30%, at most 27%, at most 25%, or at most 22% (as can be determined, in particular embodiments, by standard methods as detailed in DIN 53552);

B) an oxygen content of at least 1.0%, at least 1.5%, at least 2%, at least 3%, at least 4%, at least 5%, at least 7%, at least 10%, at least 12%, or at least 15%, and optionally, at most 40%, at most 30%, at most 25%, at most 22%, or at most 20%;

C) readily form a dispersion in distilled water, the water being at a neutral pH and the carbon black particles making up 5 wt. % of the dispersion;

D) an acid value in mmol/g, of at least 0.05, at least 0.06, at least 0.075, at least 0.1, at least 0.125, at least 0.15, or at least 0.175, optionally at most 0.5, at most 0.4, at most 0.3, or at most 0.25, and further optionally, within a range of 0.05 to 0.35, 0.06 to 0.35, 0.08 to 0.35, 0.1 to 0.35, 0.05 to 0.3, 0.06 to 0.3, 0.08 to 0.3, 0.1 to 0.3, 0.05 to 0.25, 0.08 to 0.25, 0.1 to 0.25, 0.12 to 0.25, or 0.15 to 0.25;

E) a pH value of at most 5.0, at most 4.5, at most 4.0, at most 3.5, at most 3.0, or at most 2.7, (as can be determined, in particular embodiments, by standard methods as detailed in DIN ISO 787-9);

F) a surface Zeta potential of at most −15 mV, at most −20 mV, at most −25 mV, at most −30 mV, at most −35 mV, or at most −40 mV, and optionally, within a range of −70 to −15 mV, −70 to −20 mV, −70 to −25 mV, −70 to −30 mV, −70 to −35 mV, −60 to −15 mV, −60 to −20 mV, −60 to −25 mV, or −60 to −30 mV, the surface zeta potential being measured at a pH of 12 and at a concentration of 0.1 wt % carbon black; and G) an ID/IG ratio of 0.8 or more, 1.0 or more, 1.2 or more, wherein ID and IG represent the peak intensity maxima of the D-band and G-band of the carbon black, as measured by Raman spectroscopy.

The oxygen content as provided in the specification is expressed in weight per weight of the carbon black particles, and can be converted to atomic percent by multiplying by a factor of 0.75.

In some embodiments, at least 80% of the carbon black particles, by number, are disposed at a normal distance of at least 0.01 μm, at least 0.02 μm, at least 0.03 μm, at least 0.04 μm, at least 0.05 μm, at least 0.1 μm, at least 0.2 μm, at least 0.3 μm, at least 0.5 μm, or at least 1.0 μm, from the release surface.

In some embodiments, a conformable layer transparent to the EM radiation is disposed between the radiation absorbing layer and the support layer of the transfer member.

In some embodiments, the conformable layer has a hardness of up to 50 Shore A.

In some embodiments, the conformable layer has a hardness within a range of 5 to 50, 10 to 30, 10 to 40, 10 to 50, 15 to 50, 20 to 40, or 20 to 50 Shore A.

In some embodiments, the transfer member is adapted and dimensioned such that the transfer member has a compressibility of 100-500 μm, 100-400 μm, 100-300 μm, 150-300 μm, or 150-250 μm in a direction normal to the imaging layer.

In some embodiments, the transfer member further comprises a transparent compressible layer having a compressibility of 10-80% in a direction normal to the large plane of the compressible layer. A transfer member is said to be "substantially non-compressible" when it lacks such a compressible layer and/or it lacks the afore-said compressibility in a direction normal to the large plane of the imaging surface.

Other aspects and features of particular non-limiting embodiments of the invention are set out in the detailed description and the appended claims.

BRIEF DESCRIPTION OF THE DRAWINGS

The description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures may not be drawn to scale.

In the Figures:

FIG. 3b shows to an enlarged scale the nip area illustrated as part of the system in panel FIG. 3a;

FIGS. 4, 5a and 5b are schematic representations of alternative embodiments of a digital printing system as exemplified in FIG. 3a;

DETAILED DESCRIPTION

Overall Description of a Printing System

Figure 1:
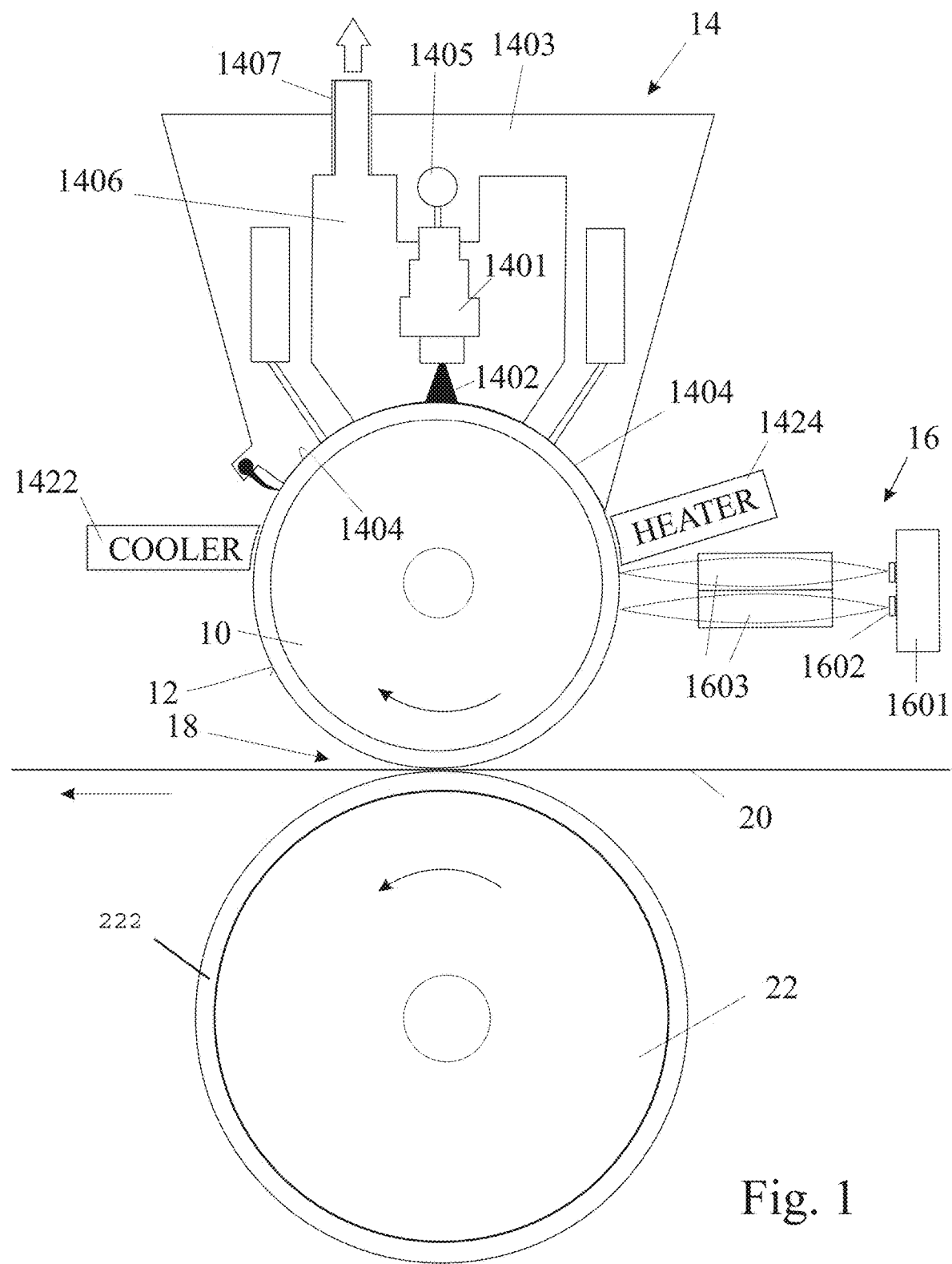
FIG. 1 depicts schematically a printing system as previously disclosed by the Applicant in WO2016/189512.

FIG. 1 shows a printing system as disclosed in WO2016/189512 of which the printing system of the present disclosure is a development. In FIG. 1, a drum 10 serving as a transfer member has an outer surface 12 that acts as an imaging surface. As the drum 10 rotates clockwise, as represented by an arrow, it cyclically passes beneath a coating station 14 where it acquires a monolayer coating of fine particles. After exiting the coating station 14, the imaging surface 12 passes beneath an imaging station 16 where radiation is applied by the imaging station 16 to selected regions of the imaging surface 12 to heat and render tacky the particle coating on the selected regions of the imaging surface 12. In FIG. 1, the radiation is applied by exposing the selected regions of the front side of the imaging surface 12 to laser radiation. By contrast, in the present disclosure, as described in more detail below, radiant energy can be applied to the rear side of the transfer member (on the surface not coated by particles).

Next, the imaging surface 12 passes through a transfer station 18, having a nip where a substrate 20 is compressed between the drum 10 and an impression cylinder 22. While not shown in the figure, the impression cylinder may include on its outer surface a compressible layer. The pressure applied at the transfer station 18 causes the selected regions of the coating on the imaging surface 12 that have been rendered tacky by exposure to laser radiation in the imaging station 16, to transfer from the imaging surface 12 to the substrate 20. The regions on the imaging surface 12 corresponding to the selected tacky areas transferred to the substrate consequently become exposed, being depleted by the transfer of particles. The imaging surface 12 can then complete its cycle, by returning to the coating station 14 where a fresh monolayer particle coating is applied to the exposed regions from which the previously applied particles were transferred to the substrate 20 in the transfer station 18. This step can be viewed as a replenishment of the particle coating. As detailed below, the substrate, also termed printing substrate, may be made of various materials (e.g., paper, cardboard, plastics, fabrics etc.), some optionally existing in coated and uncoated form depending on desired characteristics, and can be supplied to the transfer station 18 in different forms (e.g., as sheets or continuous webs).

The thermoplastic polymeric particles selectively heated for transfer to the substrate are said to form a film, or as further detailed hereinafter a polymer film. As used herein, the term "film" indicates that each spot of particle(s) exposed on the imaging surface may form a thin layer or coating of material, which may be flexible at least until transfer to the substrate at the transfer station. The term "film" should not be taken to mean that spots of adjacent particles that are heated at the imaging station are to transfer collectively as a continuous coating. It is believed that a thin film formed on the imaging surface (i.e. by one or more adjacent particles sufficiently exposed to a laser beam) may at most retain its thickness or become even thinner upon transfer. Hence the printing system and method according to the present teachings advantageously enable the printing on a substrate of a thin layer of particles that have been rendered tacky. In some embodiments, the printed film can have a thickness of 1 micrometer or less, or of no more than 800 nm, or of no more than 600 nm, or of no more than 400 nm, or of no more than 200 nm, or even of no more than 100 nm.

The Coating Station

The coating station 14 (or any coating station 14' as may be found in additional printing systems which may be combined to form printing assemblies) is similar to the coating station described in WO2016/189512 and WO2016/189513 and will not therefore be described in detail herein. Essentially, the coating station comprises a plurality of spray heads 1401 that are aligned with each other along the axis of the drum 10. The sprays 1402 of the spray heads are confined within a bell housing 1403, of which the lower rim 1404 is shaped to conform closely to the imaging surface leaving only a narrow gap between the bell housing 1403 and the drum 10. The spray heads 1401 can be connected to a common supply rail 1405 which supplies to the spray heads 1401 a pressurized fluid carrier (gaseous or liquid) having suspended within it the fine particles to be used in coating the imaging surface 12.

The fluid and the surplus particles from the spray heads 1401, which are confined within a plenum 1406 formed by the inner space of the housing 1403, are extracted through an outlet pipe 1407, which is connected to a suitable suction source represented by an arrow, and can be recycled back to the spray heads 1401. Though herein referred to as spray heads, any other type of nozzle or orifice along the common supply pipe or conduit allowing applying the fluid suspended particles are encompassed.

Figure 2:
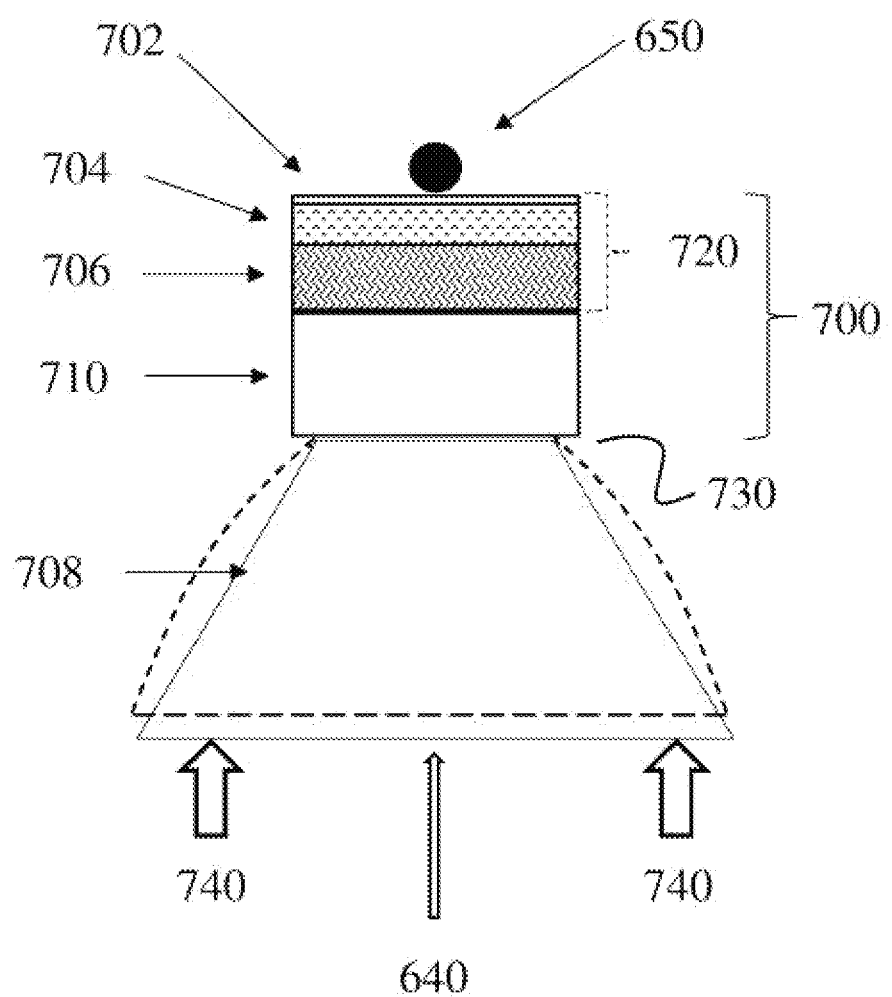
FIG. 2 is a schematic representation of a transfer member having a support layer that is "transparent" to radiation of laser emitting elements.

As an alternative to the above-described direct spraying of the fluid and suspended particles onto the imaging surface, the coating station, may, as shown in FIG. 2 of WO2016/189512 comprise a rotatable applicator operative to wipe the fluid and suspended particles onto the surface. The rotatable applicator can alternatively be a brush having fiber or foam made bristles.

In some embodiments, there can be included on the entry side of the coating system 14, and typically at an external upstream location as shown in FIG. 1, a cooler 1422 allowing lowering the temperature of the imaging surface 12 before the previously exposed regions of the particle layer are replenished.

It is possible to provide both a cooler 1422 on the entry side of the coating system 14 and a heater 1424 on the exit side. Additionally, the drum 10 may be temperature controlled by suitable coolers/heaters internal to the drum, such temperature controlling arrangements being operated, if present, in a manner allowing the outer surface of the imaging surface, or portions thereof, to be maintained at any desired temperature.

The Coating Particles

The shape and composition of the coating particles are fully described in WO2016/189512. The invention described herein may employ particles that are pigmented, dyed or colorless. Briefly, for printing of high quality, it is desirable for the particles to be as fine as possible to minimize the interstices between particles of the applied monolayer coating, and to be preferably smaller than the required image resolution. Being dependent upon the desired image resolution, for some applications a particle size of up to 10 micrometer (μm) is deemed appropriate, in particular for pigmented thermoplastic particles. However, for improved image quality, it is preferred for the particle size to be a few micrometers and more preferably less than about 1 μm. In some embodiments, suitable particles can have an average diameter between 100 nm and 4 μm, 300 nm and 1 μm, in particular between 500 nm and 1.5 μm. On account of the manner in which such particles are produced, they are likely to be substantially spherical but that is not essential and they may be shaped as platelets.

In the case of colorless particles, such as those used to form a protective or decorative over-coating, such as a varnish or lacquer, it may be desirable to use particles as large as 5 micrometers, 10 μm, 20 μm, 30 μm or even 40 μm in average diameter. While colorless particles may be the sole type desired for a particular printing system or printing job, and may have any suitable dimensions, in some embodiments, to be further detailed in the following, the colorless particles are used as last to be applied on printing substrates to which colored particles were already transferred or as first to be applied on printing substrates to which colored particles are to be transferred. While for the former case, the colored particles are thermoplastic so as to be transferable by a thermal printing system according to the present teachings, such limitation no longer applies for colored particles to be adhered to an adhesive image formed by prior transfer of thermoplastic particles. Thus, in the latter case, the colored particles may be made of any material adapted to provide the desired printing effect, and can for instance be made of plastics, metals, ceramics or glasses. Furthermore, the second particles can have any desirable shape, and be relatively spherical, bead-like, rod-like or flake like, the longest dimensions of said shapes possibly, but not necessarily, exceeding the longest dimension of the rather globular first particles. For illustration, the second particles can be metallic flakes (made of metals or alloys, and oxides thereof) and provide for a shiny mirror-like, a glittering, a pearlescent and/or a nacreous appearance.

Typically sizes are provided as average of the population of particles and can be determined by any technique known in the art, such as microscopy, Dynamic Light Scattering (DLS) or Light Scattering (LS), the former being more suited for relatively smaller particles (e.g., of up to 6 μm) and the latter being more suited for relatively larger particles (e.g., of up to 3.5 mm). The average diameter of a population of particles can be assessed by Dv50 (maximum particle hydrodynamic diameter below which 50% of the sample volume exists) and the size of a predominant portion of the population by Dv90. When the particles under study are in a relatively viscous or solid media, such as in a cured layer, such particle sizes can be assessed by microscopy, the skilled person knowing which microscope and technique to employ depending on the dimensions/magnifications to be observed. When the particles under study are in a relatively liquid media, such particle sizes can conveniently be measured by DLS or LS.

In some embodiments, the polymer film resulting from the conversion of the monolayer of particles by exposure to radiation, whether providing by itself a desired (e.g., colored) printing effect or forming an adhesive image for particles to be later applied, has a thickness of 2 μm or less, or of less than 1 μm, or even of less than 750 nm. In other embodiments, the thickness of the polymer film is of 100 nm or more, or of more than 200 nm, or even of more than 300 nm. The thickness of the polymer film may be in the range of 300 nm-1,000 nm, or of 500 nm-1,500 nm, or of 600 nm-800 nm, or of 700 nm-1,000 nm.

In embodiments, wherein the thermoplastic particles are colorless, being intended for instance for over-coating or under-coating, the particles are typically larger than pigmented particles, and the film obtained following transfer may have accordingly a greater thickness. In such embodiments, the thickness of the polymer film can be of up to 40 μm, or of no more than 30 μm, or of no more than 20 μm, or of no more than 10 μm.

In some embodiments, the particles may be substantially hydrophobic.

The Particle Carrier

The particle carrier, that is to say the fluid within which the coating particles are suspended, may be either a liquid or a gas. If liquid, the carrier is preferably water based and if gaseous the carrier is preferably air. In the interest of economy, surplus particles extracted (e.g., sucked) from the interior of the plenum of a housing may be recycled to the supply and/or applicator device.

The Imaging Station

The imaging device depicted at imaging station 16 in FIG. 1 is also fully described in WO2016/189512, particular embodiments being further explained in WO2016/189510 and WO2016/189511, and need not be described herein in detail. The imaging station (or imaging system) 16 is composed of a support 1601 carrying an array of chips 1602 each having an arrangement of individually controllable laser sources capable of emitting laser beams. The chips 1602 are individually or collectively associated with an array of corresponding lenses 1603 that focus the laser beams on the imaging surface 12 or its vicinity (e.g., to heat up the particles applied thereupon and/or to heat up an underlying radiation absorbing layer).

FIG. 1 shows the imaging station 16 as facing the front side of the transfer member 10. This requires the imaging station to be located upstream of the transfer station 18 but then it is important to ensure that the irradiated tacky thermoplastic particles on the imaging surface 12 do not lose their tackiness during transit between the imaging station 16 and the transfer station 18. In some embodiments of the present disclosure, the imaging station is located facing the rear side of the transfer member 10, thereby enabling irradiation and transfer to occur substantially simultaneously. However certain embodiments of the invention utilize an imaging station which irradiates the front side of the transfer member.

The Imaging Surface

The imaging surface 12 (and similarly the particle receiving surface 712' and 712") in some embodiments is a hydrophobic surface, made typically of an elastomer that can be tailored to have properties as herein disclosed, generally prepared from a silicone-based (release-prone) material. The silicone-based matrix may have any thickness and/or hardness suitable to bond the intended particles. The suitable hardness is to provide a strong bond to the particles when they are applied to the imaging surface 12 in the coating station 14, the bond being stronger than the tendency of the particles to adhere to one another. It is believed that for relatively thin imaging surfaces (e.g., 100 μm or less), the silicone-based material may have a medium to low hardness; whereas for relatively thick imaging surfaces (e.g., up to about 1 mm), the silicone-based material may have a relatively high hardness. In some embodiments, a relatively high hardness between about 60 Shore A and about 80 Shore A is suitable for the imaging surface. In other embodiments, a medium-low hardness of less than 60, 50, 40, 30, 20 or even 10 Shore A is satisfactory. In a particular embodiment, the imaging surface has a hardness of about 30-40 Shore A, a lower hardness believed to be preferable for spherical particles. The hardness is of at least 5 Shore A.

The hydrophobicity of the imaging surface enables the tacky film created by exposing the particles to radiation to transfer cleanly to the substrate without splitting. A surface is said to be hydrophobic when the angle formed by the meniscus at the liquid/air/solid interface, also termed wetting angle or contact angle, exceeds 90°, the reference liquid being typically distilled water. Under such conditions, which are conventionally measured using a goniometer or a drop shape analyzer and can be assessed at a given temperature and pressure of relevance to the operational conditions of the coating process, the water tends to bead and does not wet, hence does not adhere, to the surface.

Advantageously, an imaging surface or particle receiving surface suitable for use with a printing system or various components of the printing assembly herein disclosed can be flexible enough to be mounted on a drum, appropriately extendible or inextensible if to be mounted as a belt, have sufficient abrasion resistance and/or resilience, be inert to the particles and/or fluids being employed, and/or be resistant to any operating condition of relevance (e.g., irradiation, pressure, heat, tension, and the like).

The imaging surface can absorb EM radiation at the wavelength of the laser emitting elements. For instance, if the radiation is emitted in any portion of the near infrared (NIR) range within about 800-2,000 nm, then the imaging surface should absorb over at least such portion of the NIR spectrum. In this way, the heating up of the imaging surface assists in the softening of the particles disposed thereupon, sufficient heating rendering the particles suitably tacky so as to transfer to a printing substrate.

Advantageously, the EM radiation absorbing material is such that it may absorb over a relatively wide range of laser wavelengths, compatible with different types of particles, each eventually having a different sub-range, even minute ones, of laser absorbance. Carbon black (CB), which has a broad absorption and is a strong absorber in the NIR region, can be used to provide desired corresponding properties to the energy absorbing layer of the imaging surface. Incorporation of carbon black into silicone-based layers may also contribute to the thermal conductivity of the imaging surface and allow it to be modulated, if and as desired. Silicone-based elastomers comprising CB particles and methods of preparing the same are detailed in the following sections.

The imaging surface 12 in the drawing is the outer surface of a drum 10, which can be either directly cast thereupon or mounted as a separately manufactured sleeve. This, however, is not essential as it may alternatively be the surface of an endless transfer member having the form of a belt guided over guide rollers and maintained under an appropriate tension at least while it passes through the coating station. Additional architectures may allow the imaging surface 12 and the coating station 14 to be in relative movement one with the other. For instance, the imaging surface may form a movable platen which can repeatedly pass beneath a static coating station, or form a static platen, the coating station repeatedly moving from one edge of the platen to the other so as to entirely cover the imaging surface with particles. Conceivably, both the imaging surface and the coating station may be moving with respect to one another and with respect to a static point in space so as to reduce the time it may take to achieve entire coating of the imaging surface with the particles dispensed by the coating station. All such forms of imaging surfaces can be said to be movable (e.g., rotatably, cyclically, endlessly, repeatedly movable or the like) with respect to the coating station where any such imaging surface can be coated with particles (or replenished with particles in exposed regions).

The transfer member, whether formed as a sleeve over a drum or a belt over guide rollers, may comprise in addition to the imaging surface, on the side opposite the release layer, a body. As the transfer member in the present disclosure is irradiated from its rear side (i.e. the side opposite that carrying the monolayer of thermoplastic polymer particles), the body needs to be transparent to the radiation, so that the radiation may reach the energy absorbing layer which is next to, or which incorporates, the imaging surface.

The body of the transfer member may comprise different layers each providing to the overall transfer member one or more desired properties selected, for instance, from mechanical resistance, thermal conductivity, compressibility (e.g., to improve "macroscopic" contact between the imaging surface and the impression cylinder), conformability (e.g., to improve "microscopic" contact between the imaging surface and the printing substrate on the impression cylinder) and any such characteristic readily understood by persons skilled in the art of printing transfer members.

The imaging surface may serve functions other than absorb energy and assist in the release of tacky particles. The imaging surface can, for instance, be made of a material providing sufficient conformability, integrating the "conformable layer", to its "release layer" and "radiation absorbing layer" functionalities. Conversely, the latter two functions may be provided by two distinct layers, the release layer (which will be in contact with the particles) and an underlying radiation absorbing layer. Thus, an imaging surface can be a single/unique layer encompassing at least both release and radiation derived functions, optionally supplemented by conformability during impression. Alternatively, the imaging layer may be formed from at least two distinct layers selected from the group comprising release layers, radiation absorbing layers and conformable layers. In embodiments where the imaging surface consists of the three afore-mentioned types of layers (named by their predominant function), then it may be preferred to have them ordered such that the release layer may contact the particles, the radiation absorbing layer would be next (reducing the distance with the particles on the imaging surface outer side) and the conformable layer would be last, this layer being typically attachable or attached to a support. The support, as mentioned, can be rigid (e.g., the surface of a drum or any like mechanical part) or flexible (e.g., the body of a belt).

The rear side of the transfer member in the present disclosure is transparent to the wavelengths of the source of EM radiation applied thereto, whereas the radiation absorbing layer next to the imaging surface is substantially opaque to such radiation. As laser beams having a relatively wide range of emissions may be preferred, the opposite sides of the transfer member are advantageously "transparent" or "opaque" over a similar range. Assuming for instance, a laser emitting at a wavelength in the range of 800 nm to 2,000 nm, this radiation source being positioned on the "rear side" of the transfer member opposite to the imaging surface, a "transparent" member would allow sufficient progression of such beam from the rear side across member thickness, or at least until such beam reaches the radiation absorbing layer of the transfer member, over at least the same portion of the range.

Transparent Transfer Member

A transfer member having a transparent body is schematically illustrated in FIG. 2 by way of a cross-section through its layers. For convenience, a source of irradiation 640 and a single particle 650, which for clarity are not drawn to scale, are shown to illustrate how the transfer member 700 can be used in a printing system. In FIG. 2, 702 represents a release layer, which need not be transparent, but is capable of transiently retaining the particles 650 until they are selectively softened for release. 704 represents a radiation absorbing layer capable of harvesting the radiation to enable the softening of the particles, 706 represents a transparent conformable layer capable of facilitating contact between the release layer and particles thereupon and the topography of the surface of the printing substrate during transfer at transfer station 18. Though illustrated in FIG. 2 as distinct layers, the imaging surface 12 can be formed of a single/unique imaging layer 720 integrating the functions of layers 702 and 704 or the functions of layers 702, 704 and 706, the remaining layer 710 representing a support layer for all the afore-said layers which can jointly form a desired transparent transfer member 700.

The release layer 702 may have, in some embodiments, a thickness of 3 μm or less, of 2 μm or less, or between 0.5 μm and 1.5 μm.

A release layer 702 may be made of any material capable of providing sufficient adhesion to native (non-tacky) particles and enough release to particles softened by irradiation to selectively transfer. High release elastomers provide a variety of suitable candidates, including but not limited to liquid silicone resins (LSR), room temperature vulcanization (RTV) silicones, polydialkyl siloxanes (PDAS), including for instance polydimethyl siloxanes (PDMS) silicones, which can be, if needed, further functionalized by desired reactive groups (e.g., amine groups, vinyl groups, silane or silanol groups, alkoxy groups, amide groups, acrylate groups etc., and combinations thereof, as known in the art of silicones) to produce functionalized silicones. As used herein, the term "silicone" is used broadly to include such functionalized silicones, unless explicit or evident to the contrary. While generally encompassed by the term "silicone", such functionalized silicones may also be referred to as "silicone-based" polymers. Some functions can be cross-linkable moieties, while others may provide different desired properties to the elastomer. Additionally, the function of the elastomer is non-reactive and can be based on atoms such as fluor. These elastomers can be classified into addition-curable silicones and condensation-curable silicones, some chemical families enabling both curing methods. Advantageously, in some embodiments, a release layer can additionally reduce or prevent parasitic transfer. The release layer 702 is preferably devoid or substantially devoid of fillers.

Non-limiting examples of addition-curable silicone (ACS) include LSR and addition-curable RTV, PDAS and PDMS silicones, whether or not further functionalized. ACS elastomers are cross-linked to form a matrix in the presence of cross-linkers and any such agent (e.g., a platinum catalyst) promoting the bridging of the polymers, or on the contrary retarding it (e.g., for practical manufacturing purposes, by way of inhibition of the curing facilitators), any and all such agents being termed herein "addition curing" agent(s). In one embodiment, the ACS is a vinyl-functionalized silicone, which may be cured in the presence of at least one addition-curing agent, under any curing conditions suitable for said materials.

Non-limiting examples of condensation-curable silicones (CCS) include condensation-curable RTV, PDAS and PDMS silicones, whether or not further functionalized. CCS elastomers can be cross-linked to form a matrix in the absence of additional cross-linkers, such effect being provided by suitable moieties or functional groups on the silicone backbone. In some embodiments, condensation curing may further require a catalyst (e.g., a tin catalyst) and any such agent promoting the condensation of suitable moieties of the polymers, any and all such agents being termed herein "condensation curing" agent(s). In one embodiment, the CCS is a silanol-functionalized silicone, in a particular embodiment a silanol-terminated silicone. The silanol functionalized CCS may be cured in the presence of at least one condensation-curing agent, under any curing conditions suitable for said materials. In one embodiment, the CCS is a reactive amino-silicone. Addition curing agents and condensation curing agents respectively suitable for the curing of ACS and CCS elastomers are known and need not be further detailed herein. Likewise curing conditions for such materials are known to the skilled person and may, if needed, readily be optimized for any particular use by routine experimentation.

Presence of catalysts can be detected by trace analysis of tin (for CCS) or platinum (for ACS) by known analytical methods, e.g., by Inductively Coupled Plasma Spectroscopy (ICP).

A radiation absorbing layer 704 can have, in some embodiments, a thickness of 25 μm or less, or between 200 nm and 1 μm, or between 500 nm and 2 μm, or between 2 μm and 20 μm, or between 2 μm and 10 μm.

A radiation absorbing layer 704 can be made of any powder or elastomeric material capable of absorbing the radiation emitted by the laser elements of the imaging device, satisfactorily transferring heat and/or for a sufficient duration to the imaging surface (illustrated in the figure by the release layer 702) and the particles thereupon. Preferably, the materials forming such layer, and more generally the transfer member, allow the heat generated by the application of radiation by the imaging device to dissipate rapidly enough for the heating of the thermoplastic particles to be time and/or spot specific (e.g., enabling the formation of a desired pixel). Elastomers having a high absorbing ability (e.g., as assessed by the absorbance of the material per micron thickness) in the range of relevance, such as black silicone rubbers, are considered advantageous from a manufacturing standpoint.

Absorbance Abs is herein defined as being equal to $\log_{10}(I_{in}/I_{out})$ where $I_{in}$ is the radiant flux received by that material and $I_{out}$ is the radiant flux transmitted through that material. The absorbance is considered high if Abs is greater than 0.1/μm, or greater than 0.2/μm or even greater than 0.3/μm. For example, total absorbance of, e.g., 90% of the radiation (Abs=1) may be obtained by radiation absorbing layer 704 having Abs=0.1/μm and a thickness of 10 μm, or Abs=0.2/μm and a thickness of 5 μm or Abs=0.3/μm and a thickness of about 3.3 μm. A thinner radiation absorbing layer 704 may have an advantage of contributing to a higher image resolution upon printing (compared to a thicker layer), because relatively little heat may dissipate sidewise within the layer while heating the thermoplastic particles on the release layer 702. A thicker energy absorbing layer 704 may have an advantage of storing a larger amount of heat (compared to a thinner layer) thereby maintaining a required temperature for rendering the ink particles tacky for a longer duration. Too high an absorbance should be avoided, as it may result in over-heating of the neighboring layers and/or particles. In certain cases, such an over-heating may damage the imaging surface, impairing the release layer, and reducing print quality.

The same silicone resins as described for the release layer (e.g., ACS or CCS silicones, whether or not functionalized) may be used, these silicones being now supplemented with carbon black to act as an IR absorbing material. Preferably, all layers are formed by the same curing method, otherwise an intermediate layer may be required to block the migration of curing agents of one type to the layer of the other type, as such diffusion may hamper subsequent curing of the second layer. The phenomenon of poisoning is known and can be readily addressed by the skilled person.

The hardness of the imaging layer 720 of the transfer member 700, or of the layers forming the imaging surface 12, if separate, can be relatively low. A relatively soft imaging layer may assist in forming an intimate contact with the particles during operation of the printing system. In some embodiments, each of layers 702, 704, 706, and 720 may have a hardness of 50 Shore A or less, 40 Shore A or less, 30 Shore A or less and 20 Shore A or less and of at least 5 shore A.

The underlying layers 704, 706 and 710 of the transfer member 700 need to allow sufficient penetration of the relevant range of wavelengths to "activate" the radiation absorbing layer 704 from the rear side of the transfer member, allowing enough heat to travel forward toward the imaging surface so as to soften the particles rendering them sufficiently tacky for transfer, when desired.

While a transparent transfer member can hypothetically include a transparent compressibility layer, materials known for their high compressibility (e.g., having a relatively porous structure) are generally opaque and would hamper sufficient progression of radiation across member thickness (hence operability of the imaging surface). Replacing such materials by transparent ones generally affects the relative compressibility of the layer, thus imposing thicker compressibility layers to obtain overall similar compressibility of the transfer member. By way of example, while an opaque compressible layer having a thickness of 300 µm may be able to compress down to 100 µm under the pressure conditions applicable at the transfer station 18, a transparent compressible layer, which may typically have 5% compressibility under the same conditions, would require a thickness of 4 mm to enable its thickness to be similarly compressed by about 200 µm.

Figure 3A:
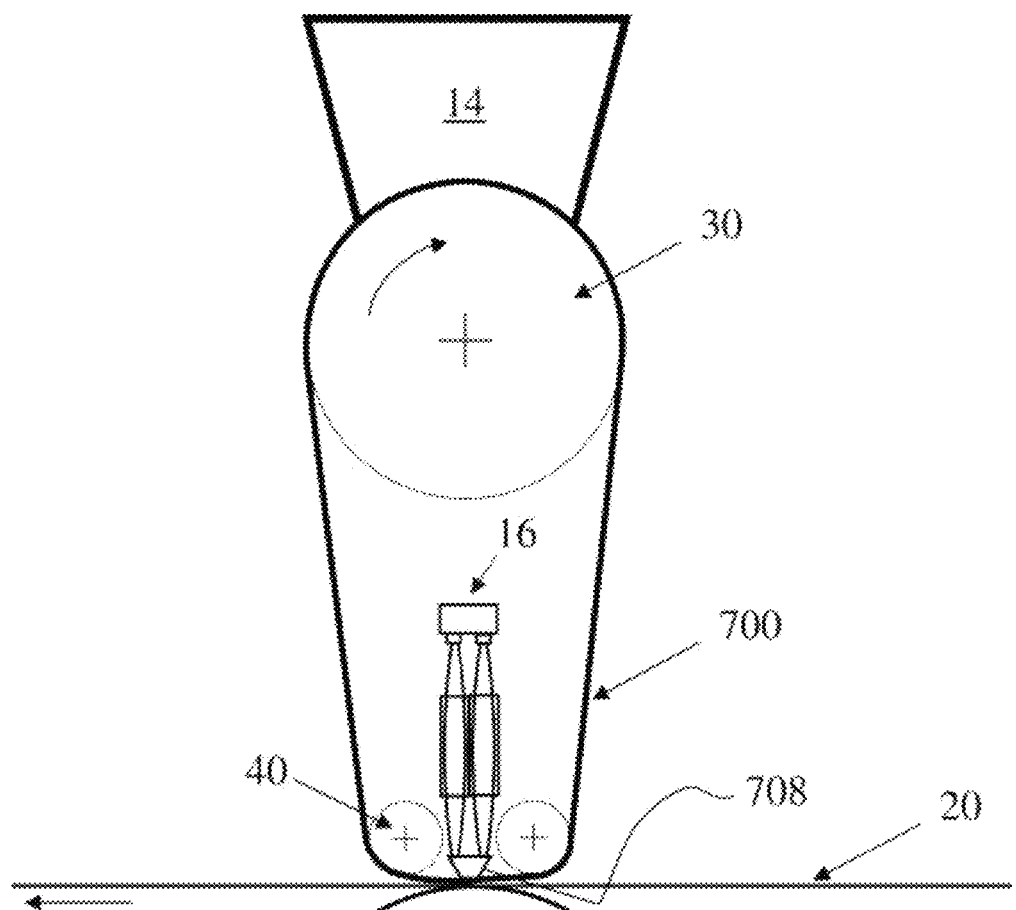
FIG. 3a is a schematic representation of a digital printing system according to one embodiment of the invention using a transfer member as shown in FIG. 2.
Figure 3B:
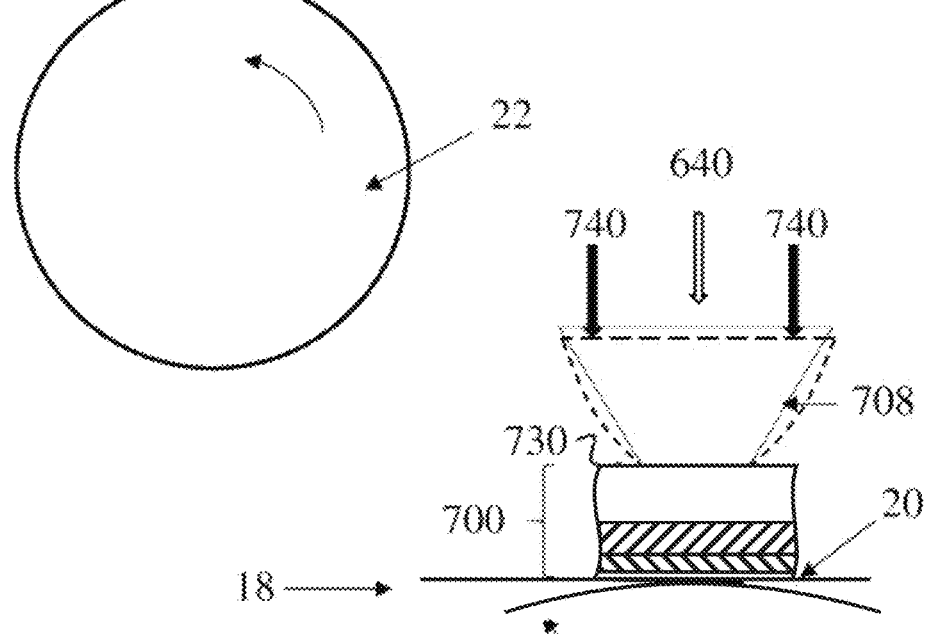

In the embodiment of FIG. 2, the compressibility function is "external" to the transfer member 700, such property being provided by the printing system relying on a compressible element 708, as illustrated in FIGS. 3a and 3b.

Figure 5A:
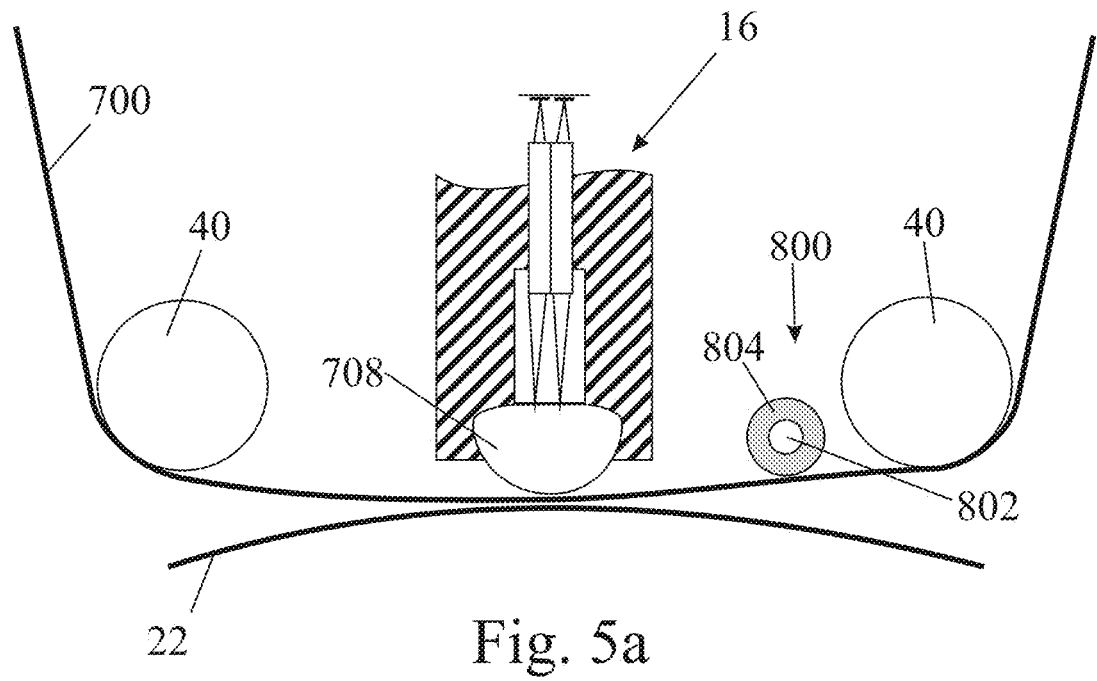
Figure 5B:
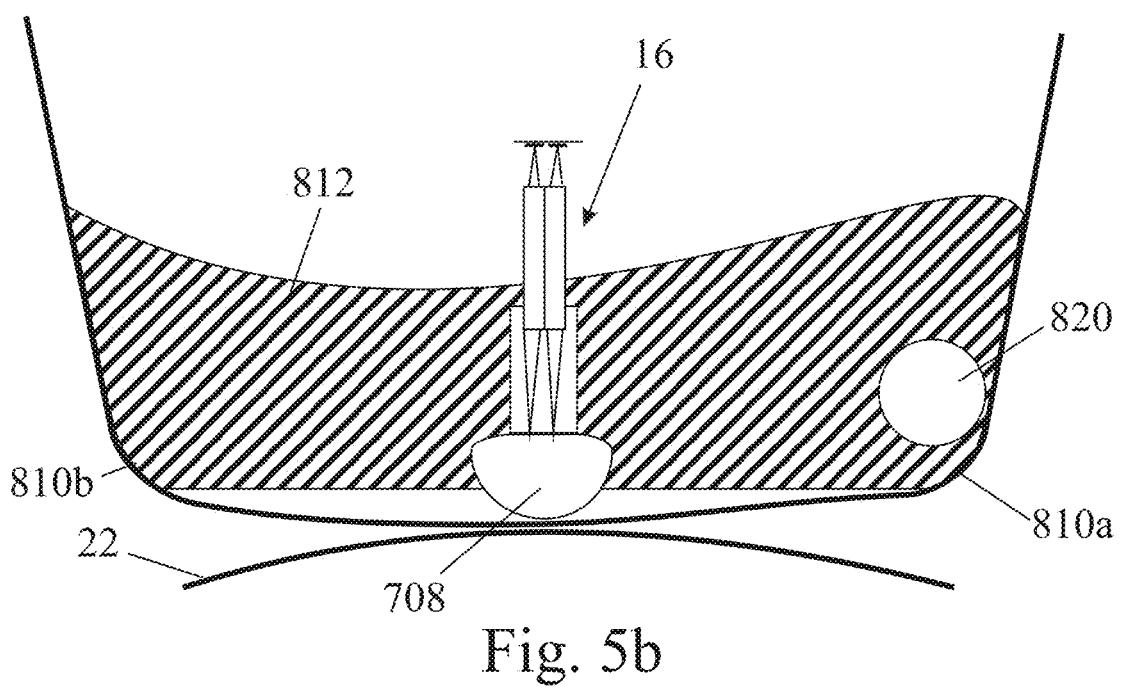
Figures 7A, 7B, 7C, 7D:
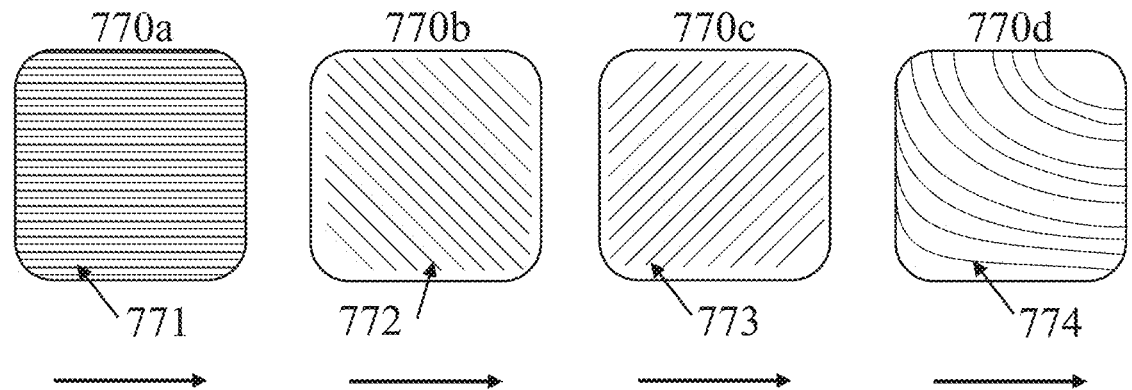
FIGS. 7a-7d show patterns of grooves that may be formed or present on surfaces contacting a rear side of a transfer member, according to various embodiments.

In some embodiments, a transparent lubricant 730 (e.g., a polyether, such as polyethylene glycol or polypropylene glycol, or a silicone oil) can be used between the rear side of transfer member 700 (e.g., between the rear side of support layer 710) and compressible element 708 (or any surface that may contact the transfer member and be optionally further pressed thereto). For example, the compressible element 708 may have a surface intended for contacting, at least partially, the rear side of transfer member 700. The surface may include one or two rounded edges (or in other words one or two curved or rounded corners) intended to form gap(s) with the rear side of transfer member 700. Such gap(s) may facilitate entry of the lubricant 730 in between the surface and the rear side, and/or exit of lubricant 730 from in-between the contacting surface and the rear side. One example of such surface of compressible element 708 intended for contacting, at least partially, the rear side of transfer member 700 and having rounded edges is schematically illustrated in FIGS. 5a and 5b. In FIGS. 5a and 5b, the entire surface of compressible element 708 intended for at least partially contacting the rear side of transfer member 700 is rounded. In other examples, the middle of the surface intended for at least partially contacting the rear side of transfer member 700 may be straight, and only one or both of the edges of the surface may be rounded. Additionally, or alternatively, the surface of compressible element 708 intended to at least partially contact the rear side of transfer member 700 may include one or more grooves (also referred to herein as one or more striations) for directing the traversal of lubricant 730 between the surface and the rear side, e.g., from one edge of the surface to the other edge. In some examples, each of the one or more grooves is parallel to the direction of movement of the transfer member 700, whereas in other examples at least one of the one or more grooves is not parallel to the direction of movement of the transfer member 700. Grooves parallel to the direction of movement are illustrated in FIG. 7a, wherein a plurality of grooves 771 on a surface 770a due to at least partially contact the rear side of the transfer member are schematically depicted as being parallel to the direction of movement of the transfer member shown by an arrow. Examples of grooves being not parallel to the direction of movement of the transfer member 700 are schematically depicted by striations 772, 773 and 774, on at least partially contacting surfaces 770b, 770c and 770d, respectively shown in FIG. 7b, FIG. 7c and FIG. 7d.

If the surface of the compressible element 708 includes a plurality of grooves, the grooves may, for instance, be parallel to one another, although not necessarily representative of the shortest distance between the two edges. However, in other instances with a plurality of grooves, the grooves may not necessarily be parallel to one another. In an example in which the compressible element 708 includes one or more grooves, the depth or depths of the one or more grooves may be any suitable depth or depths.

Usage of the lubricant 730 in between the rear side of the transfer member 700 and the compressible element 708 may enable planing of the compressible element 708, or in other words may enable the compressible element 708 to skim over the rear side of the transfer member 700 (similarly to the phenomenon in fluid bearings), thus reducing friction between compressible element 708 and transfer member 700. In some examples, the surface of compressible element 708 intended for at least partially contacting the transfer member 700 may include sharp edges (e.g., as shown in FIG. 2) rather than one or two rounded edges, and/or the surface of compressible element 708 may not have grooves (e.g., the surface may be flat). In such examples, the amount of lubricant 730 which is able to enter in between the surface and the rear side of the transfer member 700, traverse between the surface and the rear side of the transfer member 700, and/or exit from in between the surface and the rear side of the transfer member 700 may be smaller, and the friction may be larger, compared to examples with one or more rounded edges and/or grooves.

It is noted that friction between the transfer member 700 and the compressible element 708 may reduce the product lifetime of the transfer member 700 and/or the compressible element 708. Therefore, it may be advantageous to reduce friction through the usage of the lubricant 730, in order to allow for a longer product lifetime of the transfer member 700 and/or the compressible element 708. Reduction of friction due to the usage of the lubricant 730 may additionally or alternatively advantageously reduce the likelihood of stick-slip detrimentally affecting the contact between the transfer member 700 and the compressible element 708.

The lubricant 730 may additionally or alternatively function as a refractive index matching element, thereby advantageously assisting in reducing the impact of any optical defects that may be created by abrasion.

Arrows 740 illustrate how pressure forces (e.g., as applied at transfer station 18 in a direction opposite to the arrows) may affect the shape of the compressible element 708, as schematically shown by the dotted contour. While not shown, the compressible element may have a rigid backing to ensure that a substantially constant distance is kept between the radiation source and the outer surface of the impression cylinder when engaged with the transfer member during impression.

A release layer 702 can have, in some embodiments, a thickness of no more than 3 μm, generally between 1 μm and 2 μm. Release layer 702 can be made of the ACS or CCS elastomers. In one embodiment, a release layer 702 is made of cross-linkable PDAS and PDMS silicones, the silicone backbone bearing any moiety suitable for the desired curing method. In some embodiments, such silicones are fluorinated to any suitable extent. However, fluorinated silicones are less preferred since they display compatibility problems with silicone polymers of other chemical families. The release layer 702 is preferably devoid or substantially devoid of fillers that may negatively affect the activity of the CB particles of the radiation absorbing layer 704.

A radiation absorbing layer 704 can have, in some embodiments, a thickness of no more than 25 μm, generally of no more than 15 μm, and typically within the range of 1 μm to 10 μm, or between 2 μm and 5 μm.

A radiation absorbing layer 704 can be made of the same ACS or CCS elastomers as the release layer and/or as the conformable layer, if distinct. In one embodiment, a radiation absorbing layer 704 is made of cross-linkable PDAS and PDMS silicones, the silicone backbone bearing any moiety suitable for the desired curing method.

While the radiation absorbing material (such as CB) can be evenly distributed along the layer cross-section, in some embodiments a non-uniform distribution may be preferred. Such a non-uniform distribution may, for example, have a peak (representing a relatively higher density of particles) close to the imaging surface so that strong absorption may occur close to the imaging surface.

A transparent conformable layer 706 can have, in some embodiments, a thickness of no more than 150 μm, generally between 100 μm and 120 μm.

A transparent conformable layer 706 can be made of transparent ACS or CCS curable silicones or of polyurethanes. Materials suitable for the preparation of transparent layers are preferably devoid or substantially devoid of fillers, as such particulate additives may reduce or prevent the absorption of the energy by the radiation absorbing layer at the operating wavelengths of the imaging device/printing system. The transparent conformable layer should have a refractive index (RI) identical or similar (e.g., within ±5% or even ±0.5%) to the RI of the matrix of the radiation absorbing layer (without its CB contents).

In embodiments where the imaging surface 12 is in the form of a single/unique imaging layer 720 combining 702 and 704, such imaging layer 720 can have, in some embodiments, a thickness of no more than 15 μm, generally between 1 μm and 10 μm, or between 2 μm and 5 μm. Such a layer would incorporate the materials suitable for its "constituent" layers in similar amounts or proportions, as described herein for some embodiments of the invention, materials blended for the sake of release functionality will preferably be transparent. In embodiments where the imaging surface 12 further comprises layer 706 in the single/unique imaging layer 720, such imaging layer 720 can have, in some embodiments, a thickness of no more than 100 μm.

A transparent support layer 710 can have, in some embodiments, a thickness between 400 μm and 600 μm, or 450 μm and 550 μm, or between 480 μm and 520 μm.

A transparent support layer 710 can be made of PET, thermoplastic polyurethanes (TPU), silicones or any other suitable material, such materials being preferably devoid or substantially devoid of any filler able to interfere with the desired operability of the radiation absorbing layer.

A transparent transfer member 700 formed by combinations of afore-described layers can have, in some embodiments, a thickness between 500 μm and 2,000 μm, or between 500 μm and 1,500 μm, or between 500 μm and 1,000 μm, or between 500 μm and 900 μm, or between 600 μm and 800 nm.

Though a compressible element 708 can, in some embodiments, be external to the transparent transfer member, the compressibility it should provide when combined in operation with the transfer member 700 is typically of at least 50 μm, at least 100 μm, at least 150 μm, or at least 200 μm. The compressibility, in some embodiments, need not exceed 500 μm, and is generally no greater than 400 μm or 300 μm.

A compressible element 708 can be made of silicones or polyurethanes. In some embodiments, such materials are selected to provide a similar RI as the transfer member, even if physically separated therefrom, so as to maintain a substantially uniform RI along the optical path travelled by the laser beams.

Examples of Imaging Surfaces

The imaging surfaces prepared according to the above principles were hydrophobic surfaces made of an elastomer comprising silicone polymers cross-linked by condensation curing and by addition curing. When combining, in addition to release and conformational properties, radiation absorbing capabilities, the elastomeric composition forming this outer surface included an absorbing material or absorbing filler able to absorb radiation (e.g., radiation from laser beams) and to transfer heat generated thereby to the imaging surface with sufficient efficiency so as to soften the thermoplastic particles positioned thereupon to an extent they are rendered tacky enough to selectively transfer to a printing substrate. Exemplary compositions for an imaging surface including such a radiation absorbing layer were formulated by dispersing carbon black (CB) particles in compatible silicone-based polymers as detailed herein-below.

As appreciated by a person skilled in the art of elastomer formulation, a "compatible" set of materials for any particular composition or formulation means that the presence of any such compatible compound does not negatively affect the efficacy of any other compound for any step of preparation or in the final composition. Compatibility can be chemical, physical or both. For instance, a dispersant suitable to disperse carbon black into a curable silicone fluid would be compatible both with the carbon black material and with the silicone polymers to be cured (as well as with any other agent required to perfect such curing; all collectively generally termed the "silicone media"). For instance, the dispersant would not be compatible if it is, among other things, preventing, reducing or retarding the curing of the silicone elastomer, not miscible with the elastomer (e.g., forming or being disposed in a distinct phase) or deleterious to the carbon black, and causing any like undesired effects. In some embodiments, compatibility may additionally mean that the materials deemed compatible share a common property, such as a common silicon-based chemistry or a similar physical parameter, such as a comparable RI.

A compatible dispersant (e.g., miscible in the silicone matrix, forming a single phase therewith) may have a branched chemical structure and at least one carbon-black-affinic moiety having affinity to a hydrophilic surface of the hydrophilic carbon black particles. A CB-affinic moiety is selected from an amino moiety, an acrylate moiety and an epoxy moiety. The hydrophilic surface of CB generally results from oxygen-based functional groups, such as epoxy, hydroxy or carboxylic groups. A branched silicone dispersant consists of a backbone and at least one branching unit, wherein at least one of said backbone and said one or more branching units is siloxane-based, or contains at least one siloxane unit. Similarly, the at least one CB-affinic moiety can be disposed within the backbone or within the branching unit(s). If the CB-affinic branching units are only positioned at terminal ends of the backbone of the dispersant, the molecule might be considered linear. However, the terms "branched molecule" or "branched dispersant" are used herein to encompass all types and/or localization of substitution as herein described. While generally, the siloxane-based chain and the CB-affinic moieties are each disposed on separate "mono-type" components of the branched molecule (e.g., the dispersant having a siloxane-based backbone and CB-affinic moieties on branching units, or vice versa: CB-affinic moieties disposed within the backbone and siloxane-containing branching units) this "segregation" is not necessary. Suitable silicone dispersants may for example have disposed within their backbone both siloxane units and CB-affinic moieties, forming a "poly-type" backbone, the branching units stemming from any of the foregoing mono-type or poly-type backbone being also possibly a combination of siloxane-containing branching units and CB affinic branching units.

While in the description provided below, several dispersing methods are disclosed, these are not meant to be limiting. Suitable equipment may include an ultrasonic disperser, a high shear homogenizer, a sonicator, a sand mill, an attritor media grinding mill, a pearl mill, a super mill, a ball mill, an impeller, a dispenser, a horizontal agitator KD mill, a colloid mill, a dynatron, a three-roll mill, an extruder and a press kneader, to name a few. The curable compositions that may be obtained by any suitable process, as exemplified below, can then be deposited upon a substrate to form, following levelling and curing, the desired layer.

Carbon Black

It is believed that a variety of CB materials may be suitable, among other functions, as an absorbing material for an imaging surface according to the present teachings. The Applicant believes that the present teachings surprisingly enable the dispersion of hydrophilic CB particles in hydrophobic elastomeric compositions. Hydrophilic CBs, which can readily disperse in water at concentrations of at least 5 wt. %, can be characterized by their oxygen content, resulting from the oxidizing treatment used for their manufacturing, which is deemed to correlate with the content of volatile compounds. By selecting or adjusting the content of oxygen atoms on the surface of the carbon atoms to an amount within a range of 1 to 40 atomic percent or 5 to 25 atomic percent, and/or by selecting or adjusting the content of volatile components in the carbon black to constitute from about 1.5% to 50%, 1.5% to 40%, or 10% to 25%, by weight of the powder, the dispersibility of the CB and/or the stability of the dispersion may be appreciably improved. A stably dispersed CB may facilitate the preparation of an imaging surface or an absorbing layer so as to obtain a substantially uniform absorbing capacity over the entire surface thereof, even if absorbance may occur in fact underneath the outermost surface and nominal absorbance varies along the depth/thickness of the transfer member. An even behavior of the transfer member (e.g., to absorb radiation, to absorb thermal energy, to transfer heat, etc.) is desirable to achieve quality printing.

The term "atomic %" for the surface oxygen relates to the ratio of the number of oxygen atoms (O) to the number of carbon atoms (C): (O/C)×100% existing on a surface of the carbon black particles (including at any detectable depth in an interior portion of the particle). Generally, such values are provided by the CB manufacturers, but can be independently determined by known methods such as X-ray photoelectron spectroscopy (XPS), Fourier transform infrared spectroscopy (FTIR), organic elemental analysis, or electron spectroscopy for chemical analysis (ESCA).

A CB material can be treated to increase the atomic percentage of oxygen on its surface. Examples of suitable oxidizing agents, whether gaseous or liquid, include ozone, hydrogen peroxide, nitric acids, and hypochlorous acids. The carbon black can be oxidized, for instance, with ozone or an ozone-containing gas at ambient temperature. There are also methods of wet oxidation in which the carbon black is exposed to a hypohalous acid salt, including, for instance, sodium hypochlorite and potassium hypochlorite.

By way of example, a typical preparation involves mixing the carbon black powder with hypohalous acids or salts thereof, preferably in an aqueous medium, and stirring the mixture for 1-24 hours (hrs) at a temperature of room temperature (circa 23° C.) to about 90° C., elevated temperatures of 50° C. or more being advantageous. The powder is then separated from the slurry, washed to remove unreacted oxidizing agent and allowed to dry. The degree of oxidation may be controlled by adjusting the concentration of the oxidizing agent, the ratio of the carbon black particles to the oxidizing agent, the oxidation temperature, the oxidation time, the stirring speed, and the like. The amount of oxygen on the CB surface (whether oxidatively-treated or not) is preferably 5 atomic % or more, 7.5 atomic % or more, or 10 atomic % or more, from the viewpoint of dispersion suitability.

Examples of a carbon black having an amount of oxygen of less than 5 atomic %, which may therefore benefit from being oxidatively-treated to be rendered suitable, include carbon black manufactured by a known method such as the contact method, furnace method, or thermal method. Specific examples of such low surface oxygen CB include Raven® 5750, Raven® 5250, Raven® 2000, Raven® 1500, Raven® 1250, Raven® 1200, Raven® 1190 ULTRAII, Raven® 1170, Raven® 1255, Raven® 1080, Raven® 1060, and Raven® 700 (all manufactured by Columbian Chemicals Company), Regal® 400R, Regal® 330R, Regal® 660R, Mogul® L, Black Pearls® L, Monarch® 700, Monarch® 800, Monarch® 880, Monarch® 900, Monarch® 1000, Monarch® 1100, Monarch® 1300, and Monarch® 1400 (all manufactured by Cabot Corporation), Color Black FW1 (pH 3.5, BET surface area 320 m²/g), Color Black 18, Color Black S150, Color Black S160, Color Black S170, Printex® 35, Printex® U, Printex® V, Printex® 140U, Printex® 140V, NIPex® 180-IQ, NIPex® 170-IQ (all manufactured by Evonik Degussa Corporation), No. 25, No. 33, No. 40, No. 45, No. 47, No. 52, No. 900, No. 2200B, No. 2300, No. 990, No. 980, No. 970, No. 960, No. 950, No. 850, MCF-88, MA600, MA 7, MA 8, and MA 100 (all manufactured by Mitsubishi Chemical Corporation).

Carbon black having an amount of surface oxygen of 5 atomic % or more, may be prepared by oxidative treatment as mentioned, or is a commercially available product. Specific examples thereof include Color Black FW2 (amount of volatile material 16.5 wt. %, OAN 155 cc/100 g, pH 2.5, BET 350 m$^2$/g, PPS 13 nm), Colour Black FW 182 (amount of surface oxygen: 12 atomic %, amount of volatile material 20 wt. %, OAN 142 cc/100 g, pH 2.5, BET 550 m$^2$/g, PPS 15 nm), Colour Black FW 200 (amount of surface oxygen: 12 atomic %, amount of volatile material 20 wt. %, OAN 160 cc/100 g, pH 2.5, BET 550 m$^2$/g, PPS 13 nm), NIPex® 150 (amount of volatile material 10 wt. %, OAN 120 cc/100 g, pH 4.0, BET 175 m$^2$/g, PPS 25 nm), Special Black 4 or 4A (amount of volatile material 14 wt. %, OAN 100-115 cc/100 g, pH 3.0, BET 180 m$^2$/g, PPS 25 nm), Special Black 5 (amount of volatile material 15 wt. %, OAN 130 cc/100 g, pH 2.5, BET 240 m$^2$/g, PPS 20 nm), Special Black 6 (amount of surface oxygen: 11 atomic %, amount of volatile material 18 wt. %, OAN 170 cc/100 g, pH 2.5, BET 300 m$^2$/g, PPS 17 nm), all foregoing available from Orion Engineered Carbons Co., Ltd; Raven® 5000 Ultra II or Ultra III (amount of volatile material 10.5 wt. %, OAN 95 cc/100 g, pH 3.0-3.5, BET 583 m$^2$/g, PPS 8 nm; manufactured by Columbian Chemicals Company), and Fuji Jet Black (amount of surface oxygen: 12 atomic %; manufactured by Fuji Pigment Co., Ltd.). Information regarding different properties of these exemplary Carbon Blacks was provided by their respective manufacturers.

Additional CB particles that may be used for the preparation of radiation absorbing layers of transfer members configured for the present invention include Black Pearls® 800, Black Pearls® 880, Black Pearls' 2000, Black Pearls' 4350, Black Pearls® 4750, Monarch® 460, Monarch® 480, Monarch® 570, Monarch® 580, Elftex® 415, Elftex® 430, Elftex® 460, Elftex® 570, Elftex® OP, Elftex® Vulcan P, Regal® 99R and Regal® 500R (all manufactured by Cabot Corporation), Raven® 890, Raven® 890H, Raven® 1000, Raven® 1020, Raven® 1035, Raven® 1040, Raven® 1255, Raven® 3500 and Raven® 7000 (all manufactured by Columbian Chemicals Company), NIPex® 160-IQ, NIPex® 35, NIPex® 70, NIPex® 90, Printex® 60-A, XPB 229 and XPB 255 (all manufactured by Orion Engineered Carbons Co.).

The level of oxidation of the CB material can be estimated by Raman spectroscopy (e.g., using LabRAM HR Evolution, Horiba Scientific). This technique allows determining the D-band and G-band peaks of the compound under study for predetermined excitation laser wavelengths (e.g., in the range of 488 nm to 647 nm), laser powers (e.g., 40 mW) and integration times (e.g., of 10 s to 120 s). Temperature can be controlled to reduce black noise (e.g., by cooling the detector). The Raman peak intensity maxima (I) can be obtained, with or without deconvolution of the spectrum by an integrated software further allowing baseline correction, if needed. It is then possible to compute the Raman peak intensity ratio of the D-band and G-band, respectively ID and IG. The maximal intensity of each peak is typically measured on the undeconvoluted spectra. The spectral behavior and resulting band ratio (ID/IG) can be empirically correlated with the level of oxidation of the elemental carbon materials. A relatively low D-band to G-band ratio indicates that the CB is less oxidized than a CB having a relatively higher D-Band to G-Band ratio, all other structural properties of the CB being similar. By way of example, an ID/IG ratio of 0.8 or more, 1.0 or more, 1.2 or more, indicates that the CB material is relatively oxidized as desired in some embodiments of the invention. Such Raman spectra can be unaffected in the bands of interest by some elastomer matrices (notably PDMS), so that the method advantageously provides a non-destructive technique to assess CB characteristics within a cured composition. Such an analysis was performed on a sample of Colour Black FW 182 (having a volatile matter content of ~20 wt. %) and the ID/IG ratio of the CB material was found to be 0.99. For comparison, a less oxidized sample (Mogul® L having a volatile content of ~4.5%) displayed a lower ID/IG ratio of 0.75.

Another way of characterizing carbon black is by its surface zeta potential, which is the measure of the magnitude of the electrostatic or charge repulsion/attraction between particles. Zeta potential values provide insight into the CB's ability to disperse, aggregate or flocculate.

In some embodiments, the CB has a surface zeta potential of at most −15 mV, at most −20 mV, or at most −25 mV, and more typically, of at most −30 mV, at most −35 mV, at most −40 mV, or at most −45 mV.

In some embodiments, the surface zeta potential of the CB is within a range of −70 mV to −15 mV, −70 mV to −20 mV, −70 mV to −25 mV, −70 mV to −30 mV, −70 mV to −35 mV, −70 mV to −40 mV, −70 MV to −45 mV, −60 mV to −20 mV, −60 mV to −30 mV, −60 mV to −35 mV, −55 mV to −30 mV, −50 mV to −25 mV, −50 mV to −30 mV, or −50 mV to −35 mV.

In some embodiments, the surface zeta potential can be measured at a pH of at least 8.0, said measurement being optionally performed at a pH of 12.0. Conveniently, the measurement of the zeta potential of a material or of a composition can be performed at low concentration of the material in an appropriate carrier or on a diluted form of the composition. For instance, a test sample may comprise 2 wt % or less of solid material or composition ingredients, 1 wt. % or less, or 0.1 wt % or less.

The content of the CB particles in the imaging surface may advantageously be sufficient to achieve the desired radiation absorption, heat transfer, selective tackiness of the particles, which effects may in turn depend on a variety of operating conditions of a printing system in which such transfer member would be used. Typically, the carbon black is present in the layer forming the imaging surface or in the radiation absorbing layer at a concentration between 0.5% and 20% by weight of the cured layer, or from 1 wt. % to 15 wt. %, or from 2 wt. % to 10 wt. %, or from 1 wt. % to 7.5 wt. %, or from 5 wt. % to 20 wt. %, or from 10 wt. % to 20 wt. %, or from 15 wt. % to 20 wt. %.

The pH of an aqueous dispersion of the CB, as determined at 25° C., can preferably be in an acidic to around neutral range, for instance from pH 2.0 to pH 8.5, from pH 2.5 to pH 7.5, and advantageously, in a relatively acidic range from pH 2.0 to pH 5.5, or from pH 2.0 to pH 4.5, or from pH 2.5 to pH 4.0, or from pH 2.0 to pH 3.5. The pH of a CB dispersion of pre-determined concentration can be measured with any suitably calibrated pH-meter equipment, for instance, according to DIN ISO 787-9. Briefly, a 4 wt. % CB dispersion (in 1:1 distilled water:methanol) can be stirred for 5 minutes with a magnetic stirrer at about 600-1,000 rpm, whilst the pre-calibrated pH electrode is immersed in the tested dispersion. The reading of the pH value is taken one minute after switching off the stirrer.

A dibutyl phthalate (DBP) absorption value of the CB material is not particularly limited, but is typically from about 50 mL/100 g to about 200 mL/100 g, or from 100 mL/100 g to 200 mL/100 g, or from 150 mL/100 g to 200 mL/100 g. Generally, such DBP values, or similar Oil Absorption Numbers (OAN), are provided by the CB manufacturers, but can be independently determined by known methods such as according to JIS K6621 A method or ASTM D 2414-65T.

Carbon black particles can be further characterized by specific surface area measurements, the most prevalent methods including cetyltrimethylammonium bromide adsorption (CTAB), iodine adsorption and nitrogen adsorption. The CTAB method is described in ASTM D 3765. The iodine method is described in ASTM D 1510, and results in the assignment of an iodine number.

A specific surface area of the CB material is not particularly limited, but when determined by BET nitrogen absorption techniques, is preferably from 50 m$^2$/g to 650 m$^2$/g, or from 100 m$^2$/g to 550 m$^2$/g. Generally, such BET values are provided by the CB manufacturers, but can be independently determined by known methods such as according to ASTM D3037.

The substantially even dispersion/uniform absorbing capability described herein-above, can be facilitated by using CB in the formed layer having a particle size of less than one micrometer. Such dimensions are preferred not only with respect to primary particle size (PPS), but also for secondary particle size (SPS), which may result from agglomeration of such primary particles. Particles, both primary and secondary, having for a predominant portion of the population a particle size of less than half the wavelength of the emitted beam are further preferred, as scattering is accordingly reduced. Hence, CB particles having a particle size predominantly (e.g., as assessed by Dv90) of less than 500 nanometers, less than 400 nm, less than 300 nm or less than 200 nm are favored. CB particles having an average size (e.g., as assessed by Dv50), typically a primary particle size (PPS), of 100 nm or less are deemed in the nano-range, primary particles having an average size of 80 nm or less, 60 nm or less, 40 nm or less, or 30 nm or less, being particularly preferred for close particle packing. Generally, the CB particles have an average PPS of 5 nm or more, or 10 nm or more, or 15 nm or more. The size of the particles, predominantly of the primary particles, may affect their ability to closely pack within the elastomer, relatively small particles being capable of higher packing density than their relatively larger counterparts. Advantageously, a lower amount of relatively small particles may achieve a similar CB density as a higher amount of relatively large particles. Depending on their size, and additionally among other things on the viscosity of the elastomer, the conditions and duration of curing, the thickness of the layer being cured and such manufacturing factors known to the skilled person, the particles may segregate and form a gradient-like distribution across the layer thickness. Larger CB secondary particles may tend to more rapidly migrate and accumulate towards the bottom of the layer, while relatively smaller particles may follow such a trend, if at all, at a slower pace, hence remaining in relatively higher concentration in the upper section of the layer. In this context, "bottom" and "top" sections of the layer relate to their orientation during curing, and not necessarily when installed and in operation in a printing system. Such a segregation of the particles forming inner strata of particle distribution along the depth of the imaging surface may be advantageous if a sufficient thickness of the upper section becomes substantially devoid of CB particles. This "top stratum" can serve as a release layer, the absence of particles increasing its smoothness. In some cases, a relatively high smoothness of the releasing surface of the imaging layer can be desirable. Smooth surfaces generally display an arithmetical mean deviation $R_a$ of less than 1 micrometer. In some embodiments, the surface roughness $R_a$ of the imaging surface is less than 0.5 μm, or less than 0.2 μm, or less than 0.1 μm.

Manufacturers generally provide the average primary particle size of the CB material, as assessed for instance according to ASTM D 3849. Particle size distribution, whether assessed by DLS or microscopic techniques, may provide information on the primary particle size (PPS) of the material and on its secondary particle size (SPS), i.e. the size of assembly of primary particles forming for instance clusters or agglomerates.

The CB particles may have any suitable aspect ratio, i.e., a dimensionless ratio between the smallest dimension of the particle and the longest dimension in the largest plane orthogonal to the smallest dimension. In some embodiments, the carbon black primary particles are approximately spherical and can have an aspect ratio in the range of 0.2:1 to 1:5, or 0.5:1 to 1:2. Secondary particles of CB which may agglomerate therefrom are not necessarily spherical, still their aspect ratio can be in the range of 0.1:1 to 1:10, 0.2:1 to 1:5, or 0.5:1 to 1:2.

Though not essential, the carbon black primary particles may preferably be uniformly shaped and/or within a symmetrical distribution relative to a median value of the population. In some embodiments, the carbon black secondary particles are within a relatively narrow particle size distribution, such narrow PSD being advantageously maintained in the cured silicone elastomer.

First Exemplary Procedure

Grinding Step

A silicone dispersant having good heat stability and compatibility with dimethyl silicone fluids was poured into a spinning tree-roll mill grinding machine (Model JRS230, manufactured by Changzhou Longxin Machinery Co. Ltd.), and operated for up to about one hour, at room temperature (circa 23° C.). The speed was adapted to the viscosity of the paste as the milling process proceeds, such that the speed was decreased from 800 rpm to 100 rpm as viscosity increased with the addition of CB. One such dispersant was a functional pendant amine/dimethyl silicone copolymer having an amine number of 8 and a kinematic viscosity at 25° C. of about 3700 mm$^2$/s (GP-342, Genesee Polymers Corporation) which was added in an amount of 375 grams (g) so as to constitute 37.5% by weight of the total composition (wt. %). Carbon Black nano-powder (Colour Black FW 182, Orion Engineered Carbons, CAS No. 1333-86-4, 20 wt. % volatile matter, pH 2.5, 550 m$^2$/g BET Surface, PPS 15 nm) was dried for at least 2 hrs at 120° C. 250 g of the dried CB powder were slowly added to the silicone fluid, such amount of CB constituting 25 wt. % of the final composition. It is to be noted that while the CB material is defined as being in the nano-range due to its primary particle size of about 15 nm, the powder initially mixed with the dispersant mainly consisted of larger agglomerates, aggregates or chunks of CB having size of above 5 μm or even greater than 10 μm, as estimated by microscope techniques. The CB-dispersant mixture was milled until the CB powder was sufficiently size-reduced to be homogeneously dispersed in the silicone fluid and a black, high viscosity mass was obtained. Such size reduction (as well as any other step of the process) was performed under a controlled temperature environment at a temperature suitable to the most heat-sensitive of the materials employed. In the present case, amino-silicones set such threshold of heat-sensitivity, losing their activity at temperatures of about 70° C. or more. Hence the size-reduction step involving the amino-silicone dispersant was performed under controlled temperature of about 50° C. The CB primary particles formed agglomerates and the average size (e.g., diameter) of such CB secondary particles following this step was of about 200-400 nanometers, as estimated by image analysis of the cured layer later obtained under light microscope (Olympus® BX61 U-LH100-3). The light microscope analysis supported the even distribution of the clusters across the silicone matrix. Trained observers estimated that smaller clusters of 100-200 nm were also present in the matrix, though below formal level of detection. A top view picture was captured by scanning electron microscope (SEM; FEI Magellan™ 400 operated in tunneling mode) and at least 10 particles deemed by a trained operator to represent the majority of the CB population, such particles forming a representative set, were measured. The dimensions of isolated particles forming the clusters were found to be in agreement with PPS as provided by the manufacturer, and the cluster sizes was as preliminarily assessed under light microscope, confirming the presence of clusters as small as 100 nm. Without wishing to be bound by any particular theory, it is believed that amine groups of the amino-silicone dispersant bind to carboxy moieties of the carbon black, sufficiently enveloping the CB particles so as to reduce or prevent their agglomeration. Carbon black need not necessarily be functionalized with organic carboxylic acid, as oxygen absorbed on its surface behaves in a similar manner.

A mixture of vinyl functional polydimethyl siloxane (Polymer XP RV 5000, Evonik® Hanse, CAS No. 68083-18-1) containing a small amount of the same GP-342 dispersant (9:1 ratio by weight, respectively) was separately prepared with a high-shear homogenizer (T 50 digital Ultra-Turrax® equipped with R50 stirring shaft, IKA®-Werke GmbH) operated for about twenty minutes at a controlled temperature of 25° C. and at 10,000 rpm. It is believed that the presence of additional surfactant in the curable fluid prevents or reduces migration of this amine silicone polymer from the carbon particles to the vinyl functional PDMS, which diffusion, if overly extensive, could cause undesired agglomeration/aggregation/flocculation of the carbon black particles. The mixture comprising the vinyl functional PDMS was added to the black mass in an amount of about 375 g, so as to provide the remaining 37.5 wt. % of the composition. The addition was performed in step-wise fashion under continuous milling at the same conditions, until the black mass turned into a high-viscosity, shiny black paste (typically within 1 hour) having a high concentration of carbon black.

Dilution Step

In order to increase the fluidity of the black paste (25 wt. % CB) and facilitate spontaneous self-leveling after coating, the black silicone paste prepared as above-detailed was diluted to a concentration of 5 wt. % CB or less. Dilution was performed with a "Silicone premix" which was prepared as follows: a vinyl-terminated polydimethylsiloxane 5000 mm$^2$/s (DMS V35, Gelest®, CAS No. 68083-19-2) in an amount of about 50 wt. %, a vinyl functional polydimethyl siloxane containing both terminal and pendant vinyl groups (Polymer XP RV 5000, Evonik® Hanse, CAS No. 68083-18-1) in an amount of about 21.4 wt. %, and a branched structure vinyl functional polydimethyl siloxane (VQM Resin-146, Gelest®, CAS No. 68584-83-8) in an amount of about 28.6 wt. %, were mixed by the high-shear T 50 digital Ultra-Turrax® homogenizer operated at a controlled temperature of 25° C. and at 10,000 rpm for about twenty minutes.

The concentrated black paste was mixed with the silicone premix to reduce the CB concentration to 5 wt. % CB, as follows: GP-342 was added to the silicone premix so that their respective concentrations were 8 wt. % and 72 wt. % of the final diluted composition. The concentrated black paste was added so as to constitute 20 wt. % of the diluted composition, all these additions being performed under continuous stirring with a high-shear homogenizer (T 50 digital Ultra-Turrax®—IKA) at a controlled temperature of 25° C. and at 10,000 rpm. The stirring was maintained for approximately 2 hrs until the diluted black PDMS silicone mixture was homogeneous (e.g., no black chunks or aggregates were observed). Different final concentrations of carbon black were similarly prepared by accordingly adjusting the quantities of the afore-mentioned stock fluids or pastes.

Curing Step

A diluted black PDMS silicone mixture as above-prepared can be rendered curable by the addition of: at least one catalyst, typically in an amount of about 0.0005 wt. % to 0.2 wt. %, or about 0.05 wt. % to about 0.2 wt. % of the total curable composition, at least one retardant or curing inhibitor to better control the curing conditions and progression, typically in an amount of about 0.1 wt. % to 10 wt. %, or from about 1 wt. % to 10 wt. % and finally, at least one reactive cross-linker, typically in an amount of about 0.5 wt. % to 15 wt. %, or from about 5 wt. % to 15 wt. %, the addition of the reactive cross-linker initiating the addition curing of the black PDMS mixture.

The above-described 5 wt. % CB diluted black PDMS silicone mixture was rendered curable by the addition of: a platinum catalyst, such as a platinum divinyltetramethyldisiloxane complex (SIP 6831.2, Gelest®, CAS No. 68478-92-2) in an amount of about 0.1 wt. %, a retardant, such as Inhibitor 600 of Evonik® Hanse, in an amount of about 3.7 wt. %, and finally, a reactive cross-linker, such as a methylhydrosiloxane-dimethylsiloxane copolymer (HMS 301, Gelest®, CAS No. 68037-59-2) in an amount of about 8.7 wt. % of the total curable composition.

This addition-curable composition was shortly thereafter applied upon the desired transparent mechanical support with an automatic film applicator (Model: BGD281, Shanghai Jiuran Instrument Equipment Co., Ltd.) operated at 5-100 mm/s draw-down speed, the layers so applied forming predetermined thicknesses in the range of 5-200 micrometers.

As an example of a transparent body, a sheet of polyethylene terephthalate (PET, 100 & 150 micrometer thickness from Jolybar Ltd.) was used, such support being optionally pre-treated (e.g., by corona or with a priming substance) to further the adherence, to its support, of the material including the radiation absorbing layer. Corona treatment, when applied to the body, included an exposure of about 20 minutes to UV-irradiation (UltraViolet Ozone Cleaning System T10X10/OES/E, supplied by UVOCS® Inc.). A priming substance, when used to pre-treat the body, can comprise 2.5 wt. % tetra n-propyl silicate (CAS No. 682-01-9, Colcoat Co.), 2.5 wt. % vinyltrimethoxysilane (such as Dynasylan® VTMO, Evonik®), 5 wt. % titanium diisoproposy (bis-2,4-pentanedionate) (such as Tyzor AKT855, Gelese®), 2.5 wt. % platinum-divinyl tetramethyl (CAS No. 68478-92-2, such as SIP 6831.2, Gelest®) all in pure methanol AR (CAS No. 67-56-1, Bio-Lab Ltd.). The priming substance can be applied by wiping the surface of the recipient layer/body with a clean laboratory fabric soaked with the priming fluid.

Transparent supports can be made of any optically clear suitable material (e.g., silicones such as polysiloxanes, polyethylenes, such as polyethylene terephthalate (PET) and polyethylene naphthalate (PEN), polyacrylates, such as poly (methylacrylate) (PMA) and poly(methyl methacrylate) (PMMA), polyurethanes (PU), polycarbonates (PC), polyvinyls, such as polyvinyl chloride (PVC), polyvinyl alcohol and polyvinyl acetate, polyesters, polystyrenes including acrylonitrile-butadiene-styrene copolymer, polyolefins (PO), fluoro-polymers, polyamides, polyimides, polysulfones or the like, copolymers thereof or blends thereof. A material is said to be optically clear if it allows light to pass through the material without being scattered (ideally 100% transmission). While transparency is generally assessed with respect to visible light, in the present context a material would be suitably transparent if having a transparency/transmission of at least 85%, at least 90% or at least 95% to the wavelengths of relevance to the emitting beams used in any particular system. Transparency can be assessed by measuring the optical transmittance of a predetermined thin sample of the material (e.g., a flat square having edges of 1 cm and a thickness of 0.2-2 mm, or more if desired for elements external to the transfer member) using a spectrophotometer, over the wavelength range of relevance. A refractive index (RI) of about 1.35 to 1.45 indicates an optically clear/transparent material. Each layer of a transparent transfer member through which radiation should progress should have similar or same RI values and/or transparency properties, so as to constitute a multi-layered transfer member having preferably even such characteristics across its thickness. Such properties are considered similar if within ±5%, or within ±2%, or even within ±0.5%.

The refractive index (RI) of materials is generally provided by the manufacturers, but can be independently assessed by methods known to the skilled person. For fluid materials (e.g., uncured/pre-cured silicones) methods such as described in ASTM D1218 may be suitable, while solid materials can be tested according to ASTM D542.

As explained, when using a transparent transfer member and rear-side irradiation, a compressible element external to the transfer member can be used instead of an internal compressible layer. In such case, the compressible element needs to be transparent at least to the same extent. Transparent supports, layers thereof, or external elements, preferably have a yellowness index of 1 or less.

The black polydimethyl siloxanes mixture, whether applied on a pre-treated body or on a non-pre-treated body, was cured for 2 hrs at 70° C. in a ventilated oven (UT 12 P, Thermo Scientific Heraeus® Heating and Drying Ovens), followed by one hour post-curing at 120-140° C. to achieve a full cure and stable bonding of the layer to the support.

It is to be noted that the suitability of an amino-silicone polymer (deemed relatively hydrophobic) to disperse CB in size-reduced form in a silicone matrix is unexpected, in particular when the CB material is relatively hydrophilic. As a rule, dispersions of carbon black nanoparticles in silicones are difficult to achieve even when the particles and the silicone media have similar hydrophobicity. Such particles tend to agglomerate with one another, rather than remaining homogeneously dispersed in their primary particle size or any relatively small secondary particle size that would have been achieved by the dispersing step. To resolve this issue, conventional manufacturing methods aim to increase the relative polarity of the silicone media, using therefore condensation-curable silicone polymers and associated reagents.

In contrast, in the present example according to embodiments of the invention, such dispersion of CB particles was achieved while using addition curing of the PDMS silicones and counter-intuitively using amino-silicones as a dispersant. The obtained environment, which is relatively hydrophobic/non-polar, was expected to be "adverse" to relatively "size-stable" dispersions of CB. It should be additionally noted that the use of amino silicones is deemed counterintuitive because their amine moieties, when unbound and thus free to interact, are known to prevent or otherwise deleteriously affect addition-curing of the silicone matrix. Hence, the inventors have found a delicate balance concerning the amount of amino silicone present during the preparation of a CB-loaded silicone matrix. On the one hand, the amount should be enough to envelop the CB particles and prevent, reduce or delay their agglomeration/aggregation; on the other hand, an excess amount should be avoided to prevent, reduce or delay any deleterious effect on addition curing that such unbound amino silicones may have. A suitable concentration of amino silicones may depend on the type of CB particles and silicone media, as well as on the relative concentrations of the carbon black and curable silicone. This concentration may be determined by routine experimentation. In some embodiments, the weight-per-weight ratio between the carbon black and its dispersant (e.g., amino silicone, silicone acrylate etc.) is from 0.3:1 to 1:1, from 0.4:1 to 2:1, from 0.7:1 to 1.8:1, or from 0.9:1 to 1.6:1; and/or the carbon black to dispersant w/w ratio is approximately 0.3:1, 0.4:1, 0.5:1, 0.6:1, 0.7:1, 0.8:1, 0.9:1, 1:1 or 1:1.5. Without wishing to be bound to any particular theory, the attachment of the dispersant to the carbon black particles is believed to be non-covalent. Generally, even if the dispersant were to covalently bind to the carbon black particles to some extent, via chemical bonds between the molecules, the dispersant-laden particles of carbon black dispersed in a matrix as herein disclosed are not covalently bound to the silicone polymers or pre-polymers, in particular when addition-curing is being used. In other words, dispersant-laden carbon black particles prepared and/or dispersed according to the present teachings may be non-covalently, physically entrapped within the network of the cured silicone matrix of the radiation absorbing layer. While the absence of covalent binding induces relative mechanical weakness, which worsens as the amount of carbon black particles is increased, the Inventors unexpectedly found that the mechanical integrity of a radiation absorbing imaging layer according to the present teachings is surprisingly sufficiently high for a transfer member prepared therewith to retain structural integrity even at high concentrations of carbon black particles.

Amino silicones having a relatively low number of amine moieties (correlating with a low amine number) may be advantageous in achieving this balance. In some embodiments, the amino-silicone dispersant has an amine number within a range of 3 to 150, 4 to 130, 5 to 100, or 6 to 80. While the amine number of amino-silicones is generally provided by the manufacturer of such materials, it can also be determined by routine analysis using standard methods. By way of non-limiting example, the amine number of a molecule harboring amine moieties can be assessed by titration of the amino-silicone with hydrochloric acid, the amine number corresponding to the milliliters of 0.1N HCl needed to neutralize 10 g of product.

Suitable amino-silicone dispersants can be selected from the group comprising aminoethyl-aminopropyl-methylsiloxane-dimethylsiloxane copolymers (CAS No. 71750-79-3), such as commercially available as GP-342 by Genesee, having a silicone backbone and CB-affinic amino moieties as branching units; LP X 21879 by BYK Additives & Instruments (showing an absorption band at 1446 $cm^{-1}$ in FTIR, correlating to amino groups); Silamine® 2972 and Silamine® STD-100 (by Siltech Corporation), easy release silicones, such as Tego® RC-902, premium release silicones, such as Tego® RC-922, siloxane acrylates, such as Tegomer® V-Si 2854 (all by Evonik®); aminopropyl terminated polydimethylsiloxane, such as DMS-A32, DMS-A35, and DMS-A32R (all by Gelest®); aminopropyl dimethyl-polysiloxane, such as KF-8015 (by Shin-Etsu Chemical Co.); amine functional silicones, such as GP-4 and GP-581 (by Genesis Polymers Corporation), Mirasil® ADM 211 (by Elkem Silicones), Skycore® SR266 and Skycore® SR220 (by Skycent Chemicals); amino siloxanes, such as Struksilon F 571, Struksilon F 589 and Struktol VP 5421 (by Schill+Seilacher "Struktol"); and combinations thereof.

Mono-amines may be preferred, in particular when the amine moiety is terminally positioned. Without wishing to be bound by any particular theory, it is believed that once attached to carbon black, a terminal mono-amine is hindered and thus unavailable to negatively affect curing.

The surprising efficacy of the amino-silicone was further corroborated with the preparation of a first comparative formulation similar to the above, in which the amino-silicone was replaced by a dispersant of a different chemical family known for its expected suitability with CB: a polyglycerin-modified silicone KF-6106, supplied by Shin-Etsu Chemical Co. This conventional surfactant failed to satisfactorily disperse the CB particles of the present formulation.

In a second comparative example, a commercially available concentrated CB paste (Akrosperse 20-MI-005, 50% wt CB, Akrochem Corporation) was mixed with the same ACS PDMS (DMS V35) in respective amounts yielding a 5 wt. % final CB concentration. The CB paste was used as supplied, without addition of any dispersant of any type. The mixture was dispersed using the spinning tree-roll mill similarly operated. Following this control process, the CB displayed relatively large aggregates (~0.5-1.5 μm, as microscopically assessed), which were at least two-fold larger than the secondary particles formed using the present formulation and method.

Following the same rationale concerning the prevention of carbon black self-agglomeration/self-aggregation (through formation of a dispersant's envelop), it was found that in addition to amine functions of amino-silicones, acrylate functions of silicone acrylates can achieve similar CB dispersion. Exemplary silicone acrylates were formulated in a PDMS matrix as above-detailed, with minor modifications, such as the amount of the carbon black being of only 3 wt. % instead of previously described 5 wt. %. KP-578 supplied by Shin-Etsu Chemical Co., Tego® RC 711 (~1% acrylate) and Tego® RC 902 (~4% acrylate), supplied by Evonik® Industries, achieved satisfactory CB dispersion at the tested CB concentration.

In the case of silicone acrylates, an acrylate content of at least 0.5 wt. % in the silicone dispersant is believed to be satisfactory, higher contents of more than 5 wt. % being deemed preferable. It is believed that higher amount of an active CB-affinic moiety of a dispersant on any given backbone may allow reducing the amount of dispersant necessary for the dispersion of same amount of CB particles. The content of acrylate in the silicone dispersants is typically provided by their suppliers, but can be determined by standard measuring procedures.

Second Exemplary Procedure

While the afore-mentioned method of preparing a radiation absorbing layer or an imaging layer including the same, such layers able to later form an imaging surface, was substantially devoid of added volatile organic solvents, the following alternative procedure makes use of such liquids. Such solvents, when compatible with the intended silicone fluid, may facilitate some stages of the layer preparation or application to recipient layers or supports, a relatively high volatility being advantageous in reducing or eliminating the presence of these solvents in a final transfer member. A solvent is deemed sufficiently volatile if capable of fully evaporating, or substantially so, during curing.

In the present example, 50 g of CB (Colour Black FW 182, Orion Engineered Carbons) having a Dv10 of about 2.9 μm, a Dv50 of about 4.5 μm, and a Dv90 of about 6.1 μm, as measured by DLS (Malvern Zetasizer Nano S) were mixed with 50 g of amino-silicone dispersant (BYK LP X 21879, having an amine number of about 36, BYK Additives & Instruments) in 200 g of xylene AR (having a boiling point of about 138.4° C., CAS No. 1330-20-7, Bio-Lab Ltd.). As in previous example, the CB powder was dried for at least 2 hrs at 120° C. before being mixed with the silicone dispersant. The dispersion was carried out in an attritor bead mill (Attritor HD-01, Union Process®) with stainless steel beads of about 4.76 mm (SS 302 3/16 inch beads, Glen Mills Inc.) at 700 rpm until the CB particles reached an average SPS (e.g., as assessed by D50) of less than 100 nm, generally of about 70 nm, which typically required about 1.5-2.5 hrs, depending on the batch size. The size reduction was performed under controlled temperature of 50° C. The size distribution was then assessed by DLS (Malvern Zetasizer Nano S) on a sample comprising about 0.1 wt. % of CB and the CB particles co-milled with the dispersant were found to be predominantly in the nano-range (having a Dv10 of about 48 nm, a Dv50 of about 74 nm, and a Dv90 of about 139 nm).

The CB dispersion was added to a two-part LSR silicone fluid, the relative amount of the added dispersion depending on the desired final amount of CB in the matrix. In the present set of experiments, the CB concentrations per weight of the final matrix (i.e. excluding the volatile solvent) were about 2.4 wt. %, 4.5 wt. %, 6.5 wt. %, 8.3 wt. %, 11.5 wt. % and 14.3 wt. %. The according weight of CB dispersions (i.e. about 6 g, 12 g and so on) was added to 20 g of Silopren® LSR 2540 (Part A), gently hand mixed, then poured into 20 g of Silopren® LSR 2540 (Part B), by Momentive Performance Materials Inc. It is noted that adding the CB materials to a pre-mix of Part A and Part B of the LSR was also found to be satisfactory. The resulting CB silicone fluid was further mixed for about three minutes in a planetary centrifugal mixer (Thinky ARE-250, Thinky Corporation) operated at 2,000 rpm at ambient temperature and allowed to defoam under sole same centrifugal conditions for another three minutes. A sample was cured at 140° C. for about 2 hrs. The pattern of dispersion of the CB particles in the silicone matrix was assessed by light microscopy as previously detailed and found stable over the curing period of the LSR components.

To facilitate the application of the afore-mentioned CB dispersed LSR silicone fluid, the stock was diluted in excess volatile solvent, xylene in the present case, typically at a weight per weight ratio of at least 1:4, for instance at 1:9 wt./wt. The CB particles in the diluted silicone matrix appeared to remain stably dispersed for a period of time corresponding at least to duration of casting, as assessed by light microscopy.

The diluted CB-LSR-xylene suspension was applied to a smooth releasable support (e.g., non-treated PET sheet) by spray coating using an air pressure brush. Alternative application methods are possible (e.g., rod coating and the like). While partial curing of the silicone matrix may proceed at relatively low temperature of 100-120° C. (taking at most 2 hrs, but generally about 0.5-1 hr, depending on layer thickness), such step can be accelerated by raising the temperature (e.g., reducing curing duration to about 20 minutes if cured at 140° C.). A clear silicone layer (due to serve as a conformational layer) was then cast on top of such a partially cured radiation absorbing layer/imaging layer. One such silicone overcoat was a two-component clear liquid silicone, QSil 213, commercially available from Quantum Silicones. The resulting PET-supported layers were further partially cured at about 100° C. for approximately 1-2 hrs. The PET support was then peeled away and the two layers inverted so as to have the CB-loaded radiation absorbing layer facing up and the clear conformational layer facing down, the latter layer being then attached to the desired support (e.g., a transparent support) by any suitable method. In some embodiments, the attachment of such layers to the support contributed to the completion of the curing of the imaging surface.

This alternative procedure allows the preparation of a silicone matrix having a relatively high load of carbon black particles, such particles having the advantage, as in the previously described method, of being in the sub-micron range and even predominantly in the nano-range.

Third Exemplary Procedure

While the afore-mentioned methods of preparing a radiation absorbing layer, or an imaging layer including the same, were based on addition-curing of cross-linkable addition curable silicones, the present procedure alternatively involves condensation-curing of cross-linkable condensation-curable silicones.

In a first step, the CB material was dried (at least 2 hrs at 120° C.), then size reduced in the presence of a silicone dispersant. In the present example, 50 g of CB (Colour Black FW 182) were mixed with 50 g of amino-silicone dispersant (BYK LPX 21879) in 100 g of hexamethyl-disiloxane (HMDSO; having a boiling point of about 101° C., CAS No. 107-46-0, Sigma-Aldrich Co. Ltd.). HMDSO was used as a volatile liquid diluent, in a manner similar to xylene in previous example. The dispersion was carried out for 4 hrs in an attritor bead mill with stainless steel beads of about 4.76 mm (as previously described) at 700 rpm until the CB particles reached an average SPS (e.g., as assessed by D50) of about 90 nm, as assessed by DLS. The size reduction was performed under controlled temperature of 25° C.

The size distribution was then assessed by DLS (Malvern Zetasizer Nano S) on a sample comprising about 0.1 wt. % of CB and the surfactant-dispersed CB particles were found to be in the sub-micron to nano-range (having a Dv10 of about 52 nm, a Dv50 of about 91 nm, and a Dv90 of about 211 nm).

In a second step, the CB dispersion was added to a silanol-terminated polydimethylsiloxane, the relative amounts of the added dispersion depending on the desired final amount of CB in the matrix. In the present set of experiments, the CB concentrations per weight of the final matrix were about 5.5 wt. %, 12.5 wt. % and 21.4 wt. %. The according weight of CB dispersions (i.e. 40 g, 80 g and 120 g) was added to silanol-terminated PDMS (DMS S-27, 700-800 mm$^2$/s, Gelest®) in respective amounts of 160 g, 120 g and 80 gr. The resulting CB silicone fluid was mixed for about ninety minutes in the attritor under the same conditions (700 rpm and 25° C.) resulting in a black mass of condensation-curable PDMS.

To 9 g of CB-dispersed in the curable silicone, were added 1 g of cross-linker (ethylpolysilicate PSI023, Gelest® or ethylsilicate 48, Colcoat) and 0.05 g of tin catalyst (dioctyl tin bis(acetylacetonate) Tin Kat® 223, CAS No. 54068-28-9, TIB). The curable mixture was degassed and applied to a desired support. Prior to the application of the degassed mixture, a transparent PET was pretreated with ozone and coated with a priming layer (SS4120, Momentive) to facilitate attachment. The condensation-curable silicone layer was applied by a rod wire at predetermined thicknesses of up to about 40 μm (including layers of 5 μm and 20 μm) and allowed to partially cure at ambient conditions (circa 23° C. and 30-60% RH) for about 12-24 hrs. The partly cured structure was transferred to an oven for 2 hrs at 120-140° C. and about 30% RH, for curing finalization. The pattern of dispersion of the CB particles in the condensation-cured silicone matrix was assessed by light microscopy as previously detailed and found stable, the particles being well-dispersed and without particles flocking.

While silicones comprising CB are commercially available, attempts to size reduce their CB contents to such desired particle size ranges have so far proven difficult. In a comparative example, a commercially available concentrated CB paste wherein CB is pre-dispersed in a silicone fluid (Akrosperse 20-MI-005, 50% wt CB, Akrochem Corporation) was mixed with the same CCS PDMS (DMS S-27) in respective amounts yielding a 5 wt. % final CB concentration. The CB paste was used as supplied, without addition of any dispersant of any type. The mixture was dispersed using the spinning tree-roll mill operated as described in the first experimental procedure. Following this control process, the CB displayed relatively large aggregates (~0.5-1.5 μm, as microscopically assessed), which were, as previously observed with the ACS control, at least two-fold larger than the secondary particles formed using the present formulation and method.

Without wishing to be bound by any particular theory, it is believed that the conventional formulations lack CB particles having suitable properties, and/or appropriate amounts and/or suitable agents able to prevent the reagglomeration of primary particles that may be transiently obtained during any such milling.

Optical Measurements

Some optical properties of the radiation absorbing layers or imaging surfaces prepared by the above-described methods were assessed. Unless otherwise stated, the sample of interest was cast on a smooth support, such as a glass slide, and leveled by rod coating to a known thickness and cured (e.g., 1-2 hrs at 120-140° C.), the cured layer having generally a thickness of at least 2 μm, as established by confocal microscopy.

The cured layer was gently separated from its casting support and placed in a film holder suitable for subsequent measurements. The optical absorbance of such samples was measured with a spectrophotometer over a range of at least 300 nm to 1200 nm (Cary 5000, UV-Vis-NIR spectrophotometer from Agilent Technologies). The drop in intensity between the two sides of the film was normalized to the thickness of the tested samples and the absorbance of such layers per micrometer of thickness (Abs/μm) was calculated.

Representative results of normalized absorbance at selected wavelengths, for layers including CB particles dispersed with amino-silicone dispersants, are presented in the table provided below in which the values reported for the matrices loaded with carbon black relate to the effect of the sole CB particles (the baseline values of the respective matrices being subtracted).

TABLE 1

| No. | Sample | Abs/μm @ 300 nm | Abs/μm @ 500 nm | Abs/μm @ 700 nm | Abs/μm @ 900 nm | Abs/μm @ 1100 nm |
|---|---|---|---|---|---|---|
| 1 | 2.5 wt. % CB in PDMS | 0.293 | 0.093 | 0.069 | 0.056 | 0.048 |
| 2 | 5.0 wt. % CB in PDMS | 0.479 | 0.188 | 0.138 | 0.109 | 0.091 |
| 3 | 7.5 wt. % CB in PDMS | 0.692 | 0.291 | 0.204 | 0.158 | 0.129 |
| 4 | Control: 10 wt. % CCB in PDMS | 0.290 | 0.102 | 0.090 | 0.087 | 0.085 |
| 5 | Ref 0 wt. % CB in LSR | 0.00103 | 0.00149 | 0.00137 | 0.00150 | 0.000135 |
| 6 | 2.4 wt. % CB in LSR | 0.067 | 0.041 | 0.029 | 0.021 | 0.018 |
| 7 | 4.5 wt. % CB in LSR | 0.196 | 0.106 | 0.074 | 0.056 | 0.047 |
| 8 | 6.5 wt. % CB in LSR | 0.439 | 0.224 | 0.156 | 0.117 | 0.096 |
| 9 | 8.3 wt. % CB in LSR | 0.651 | 0.326 | 0.222 | 0.165 | 0.133 |
| 10 | 11.5 wt. % CB in LSR | 0.681 | 0.379 | 0.261 | 0.195 | 0.159 |
| 11 | 14.3 wt. % CB in LSR | 0.733 | 0.413 | 0.285 | 0.214 | 0.172 |
| 12 | 5.5 wt. % CB in LSR | 0.549 | 0.226 | 0.167 | 0.135 | 0.114 |
| 13 | 12.5 wt. % CB in LSR | 0.577 | 0.271 | 0.214 | 0.172 | 0.147 |

As can be seen in the above table, CB particles dispersed according to the various methods herein disclosed provided comparable absorbing properties per micrometer depth of layer, such absorbance generally decreasing as the wavelengths increased. In the above, the methods of preparation and resulting layers were exemplified with three types of silicone polymers, two types of curing method and two types of amino-silicones, see items 1-3 for addition curing of ACS PDMS, items 6-11 for addition curing of ACS LSR and items 12-13 for condensation curing of CCS PDMS. These examples also represent different types of interactions between the silicone dispersants and the CB particles. Amino-silicone dispersants are expected to form acid-base relationship or amine-epoxy interactions. Silicone acrylate dispersants are believed to form dipole:dipole interactions.

All items representing exemplary embodiments of silicone matrix embedded dispersions of CB particles prepared according to the present teachings, formed clear samples (i.e., lacking haziness/turbidity), as assessed by visual inspection. Such results support the compatibility of the silicone dispersants with the curable silicone elastomers, including their miscibility therein. Such compatibility can also be preliminarily assessed in a screening method of such materials, performed in the absence of carbon black particles.

For comparison, similar silicone matrices prepared in the absence of CB particles according to the present teachings displayed an insignificant to null baseline normalized absorbance, of about 0.001 Abs/μm or less, over the same range of wavelengths, see item 5 for LSR matrix, the PDMS matrices behaving similarly whether cured by addition-curing or by condensation-curing. The impact of the CB nanoparticles dispersed according to present teachings can be seen from the positive correlation between the wt. concentration of CB in the silicone matrix and the absorbing capacity of the layer over the tested range. Based on the present set of results peak or plateau of absorbance for each particular formulation are expected at carbon loading of at least 10 wt. %, at least 15 wt. % or possibly at carbon loading of more than 20 wt. %. Such CB concentration dependent patterns can readily be established by the skilled person, who can elect desired CB loading as per peak of optimal activity and/or intended use. For all practical purposes, it is believed that carbon black presence in curable or cured silicone compositions need not exceed 30 wt. %, being often of no more than 25 wt. %.

Reverting to the table, in a control experiment, see item 4, a comparative layer was prepared in which the same carbon black material was milled and incorporated in a PDMS matrix similarly to items 1-3, the method however lacking any amino-silicone dispersant. In the resulting layer, the CB particles were therefore of a more conventional size, in the range of 0.5-1.5 μm. This conventional CB (CCB) material was embedded in the PDMS matrix at a relatively high concentration of 10 wt. %. Despite such high load, the CCB control provided a poorer absorption relatively to lower concentrations of CB particles prepared according to some embodiments of the invention. In this experiment, the 10 wt. % CCB in PDMS was found comparable to the 2.5 wt. % CB in PDMS, see items 4 and 1, respectively. Therefore, the present methods and formulations are approximately 4-fold superior, with respect to the amount of CB particles providing similar absorbance. The ability to reduce the amount of CB to achieve a particular radiation absorbance can have numerous beneficial implications, beyond cost reduction, as readily appreciated by the skilled person.

An adhesive layer can be used to attach the layers of the transfer member. Such layers have a thickness which may depend on the roughness of the recipient layer, for relatively smooth recipient body, the adhesive layer can have a thickness typically not exceeding 10 μm. Any suitable adhesive can be used, its composition being compatible with the layers to be attached thereby. Furthermore, the adhesive layer, as any other layers of the transfer member, is preferably adapted to the working conditions to which the transfer member is subjected in operation of the printing system.

An adhesive layer can be made of silicones, polyurethanes, and such known flexible elastomeric adhesive materials. Such examples are not limiting, materials suitable to adhere elastomers one to another being known and in no need of being further detailed herein.

Alternatively, a priming layer can be used, the composition of which depends on the layers to be bound. Such layers typically have a thickness of 1 μm or less. Suitable materials include silanes, titanates and other such sizing agents.

In some embodiments, adhesive layers or priming layers are not necessary, the attachment of one layer to another being achieved by co-curing of the two layers, at least one of which would have been previously partially cured.

Figure 8:
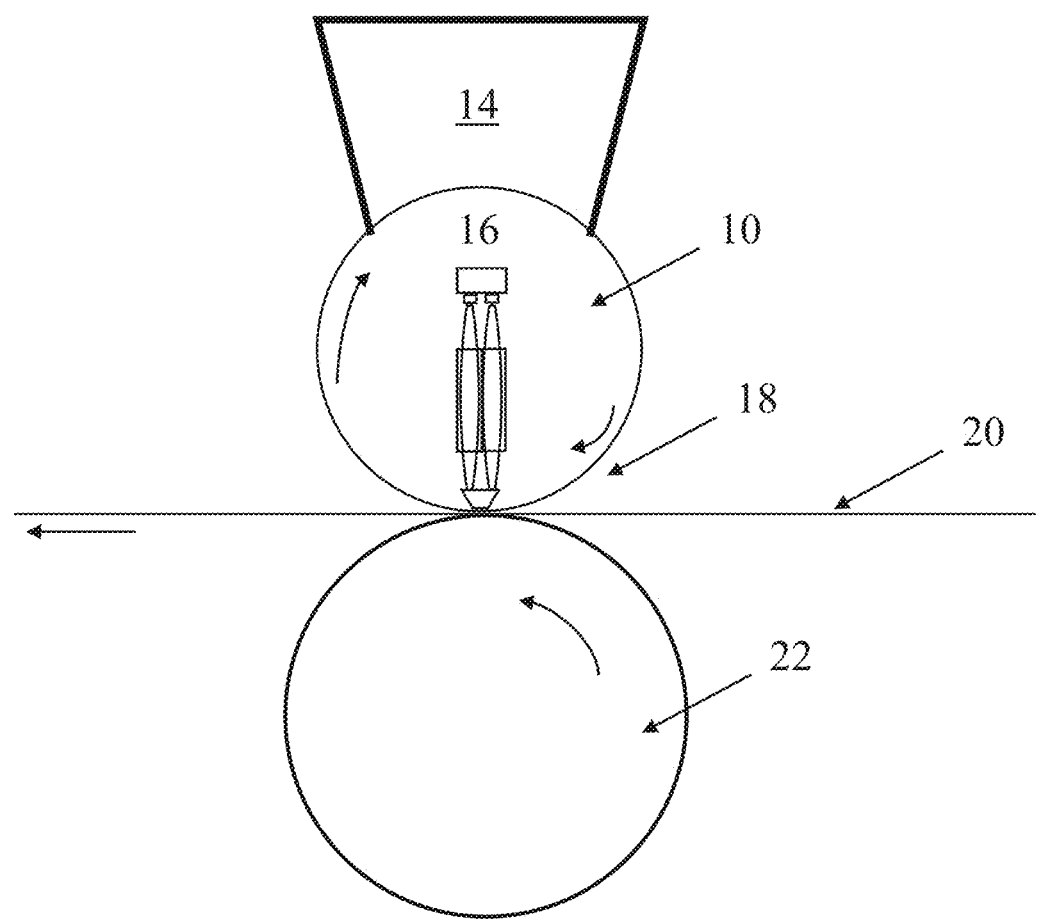
FIG. 8 is a view generally similar to FIG. 3a but of an alternative embodiment in which the imaging station is disposed within a drum instead of within the circumference of a continuous endless belt.

In embodiments of the present invention, the imaging and transfer stations are combined and the imaging surface 12 (and the particles thereon) is selectively heated substantially at the same time as it is pressed against the substrate for transfer of the films of tacky particles from the selected regions of the imaging surface. This may be achieved, for example, by forming the drum 10 of a transparent material and locating the imaging station 16 within the drum, as schematically illustrated in FIG. 8, or externally to the drum and across it at a position "facing" the transfer station. By "transparent" it is meant that the material of the drum and/or of the imaging surface does not significantly affect the irradiation of the selected particles and/or allow the transfer of sufficient power to render them tacky.

Figure 4:
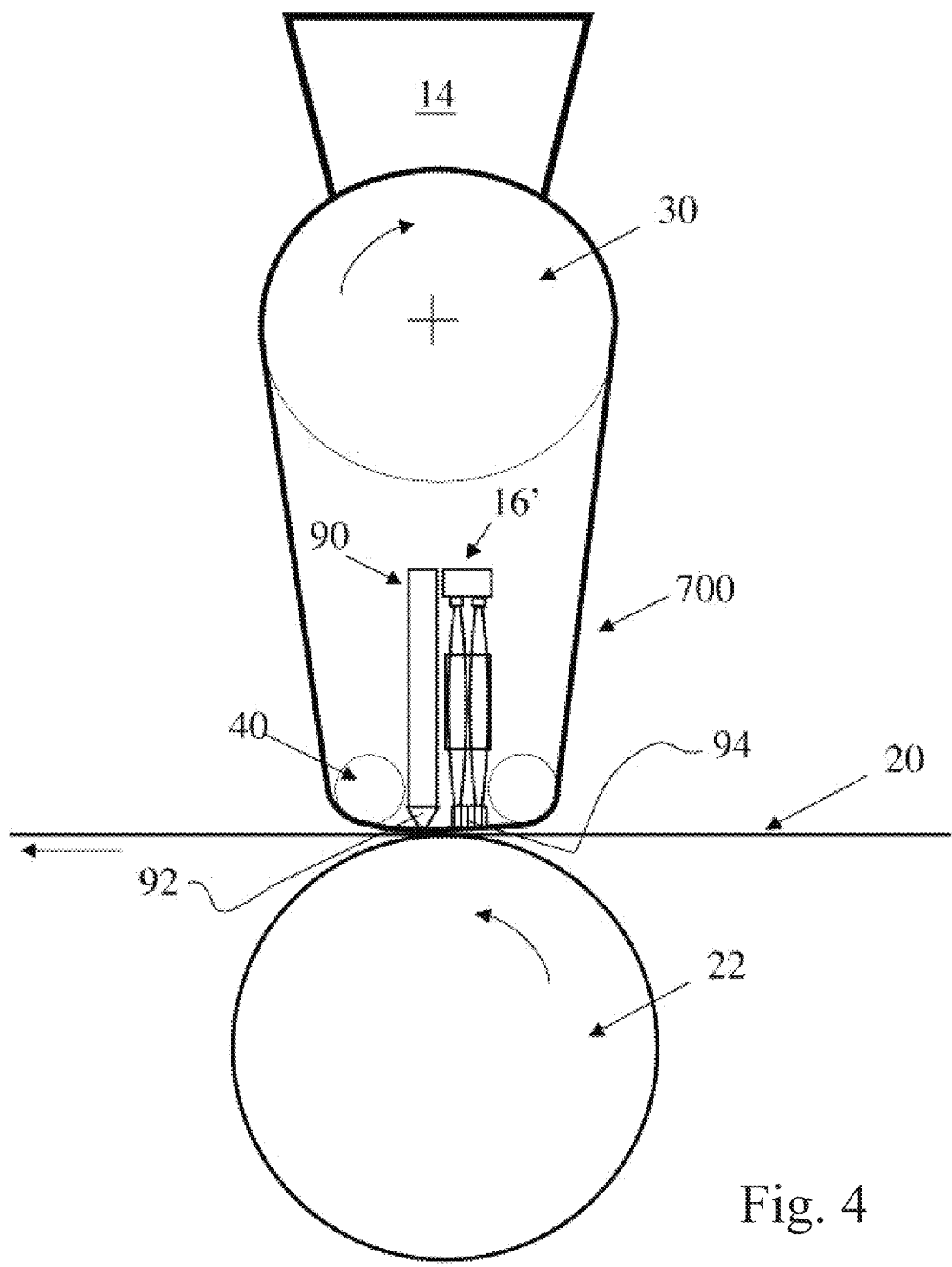

Some embodiments of such transparent alternative printing systems are schematically illustrated in FIGS. 3 to 5, to be described in more details in the following.

As described above, the thermoplastic polymer particles are rendered tacky by application of radiation to the rear side of the transfer member, the latter needs to be transparent, as is the case for the transfer member 700 illustrated in FIG. 2. As shown in FIG. 3*a*, a coating station 14 can coat the imaging surface of a transparent transfer member 700—being illustrated as a looped endless belt—with thermoplastic particles. The transfer member can continuously (or intermittently) cyclically circulate over a driving drum 30, serving at the coating station a purpose similar to previously described drum 10, and over guide rollers 40. An imaging station 16 positioned within the perimeter formed by the continuous belt is schematically shown. The laser beams emitted by the imaging device at such a station are projected towards the rear side of a run of the transfer member passing along the gap formed between guide rollers 40. The imaging device comprises a stationary transparent compressible element 708, which can contact the rear side of the transfer member at the transfer station. When referring to the stationary compressible element, the term "compressible" is used to describe the deformation which the element undergoes when subjected to pressure, in which the dimension normal to the process direction diminishes in response to increased transfer pressure, while its orthogonal dimension increases. Thus, though the element 708 is not compressed, in the sense of its density being increased, its thickness dimension is reduced.

While in the present illustration, two guide rollers 40 bound the run of transfer member subjected to the imaging device or station 16 and contacting its compressible element 708, this should not be construed as limiting, as one or more guide rollers or smooth sliders may be used for this effect.

FIG. 3*b* schematically shows a view of this printing system at the impression nip 18, to an enlarged scale. At the nip 18, the transfer member 700 and the printing substrate 20 are compressed between an impression cylinder 22 on one side and the compressible element 708 on the other side. As can be seen, the compressible element 708 of the imaging device may contact a multi-layered transfer member, the thermoplastic particles (not shown) being positioned on the outer imaging surface (that facing the printing substrate). As previously mentioned, a transparent lubricant 730 can be used to facilitate the sliding of the transfer member rear side over the compressible element 708, and/or compressible element 708 can include one or more grooves and/or rounded edges, to facilitate entry in between, traversal between, and/or exit from in between compressible element 708 and the rear side of transfer member 700. The thickness of a compressible element 708 and of the layers forming a transparent transfer member to be used therewith are selected so as allow the radiation emitted by any laser element of a chip of an imaging device to target the radiation absorbing layer 704, or any sufficiently adjacent strata, of the member to permit sufficient radiation absorbance, and subsequent heat delivery to the thermoplastic particles.

In FIG. 4, an alternative configuration of rear side irradiation of particles positioned on an imaging surface through a transparent transfer member, is schematically illustrated. The transparent transfer member 700 can be as described above by reference to FIG. 2. In this embodiment, the compressible element previously shown as 708 in FIG. 3 is no longer associated with the imaging device or station 16', but with a separate pressure applicator 90, the compressible segment of which, identified as 92, serves a similar purpose as previous 708. Similar concerns may therefore apply. For instance, a lubricant can be used to facilitate the sliding of the transfer member rear side over the compressible segment 92 of the pressure applicator 90, and/or, for instance, compressible segment 92 may include one or more grooves and/or rounded edges, to facilitate entry in between, traversal between, and/or exit from in between compressible segment 92 and the rear side of transfer member 700, as discussed above with reference to compressible element 708 and FIGS. 7*a*-7*d*. However, the compressible segment 92 may now be relieved from certain constraints of previous 708. By way of example, the compressible material forming such segment need not necessarily be transparent, permitting the use a wider range of elastomers or other compressible materials and/or arrangements (such as supporting the compressible element by springs or gas by way of example). Regarding the imaging device 16', the segment 94 no longer needs to be as compressible, but mainly transparent to enable sufficient progression of the laser beams towards the imaging surface. Segment 94 may or may not be intended for at least partial contacting of the transfer member rear side. If segment 94 is intended to at least partially contact the transfer member rear side, a lubricant can be used, for instance to facilitate the sliding of the transfer member rear side over segment 94 and/or, segment 94 may include, for instance, one or more grooves and/or rounded edges, to facilitate entry in between, traversal between, and/or exit from in between segment 94 and the rear side of transfer member 700, as discussed above with reference to compressible element 708 and FIGS. 7*a*-7*d*. Regardless of whether or not contact is to be made, segment 94 can be made of a variety of materials, including, for example, glass and transparent plastics, such as acryl. Such materials are typically preferable, as far as choice and optical imaging quality are concerned, over compressible transparent elastomers from which previous compressible element 708 would be formed. In the embodiment illustrated in FIG. 4, irradiation takes place immediately upstream of the impression nip.

While this embodiment is less compact than the alternative embodiment schematically illustrated in FIG. 3*a*, it offers a substantially constant optical path length between the laser beam emitting element of the imaging device and the absorbing layer being targeted within the transfer member. A printing system operating with such essentially invariable optical path length is expected to benefit from a more uniform spot aspect and a more even optical magnification, resulting on the surface of the substrate in images of higher quality.

FIGS. 5*a* and 5*b* schematically depict separate embodiments of lubrication systems that may be used to apply lubricant 730 to the rear surface of transparent transfer member 700. Any one of the embodiments of FIGS. 5*a* and 5*b* may be used with the systems described in FIG. 3*a* and in FIG. 4.

In FIG. 5*a*, lubrication is applied to the rear surface of the transfer member 700 by a lubrication roller 800 positioned upstream, and preferably close to the compressible element 708. Lubrication roller 800 extends parallel to the rotational axes of the guide rollers 40 and across the entire width of transfer member 700. Lubrication roller 800 may comprise a hollow tube 802 in fluid communication with a lubricant reservoir (not shown here), and having a multitude of apertures along its cylindrical surface. Hollow tube 802 may be further enveloped along its cylindrical surface with a compressible sleeve 804 made of a porous material, such a sponge. The sleeve 804 is thereby configured to allow liquid to drip in a generally radial direction from the hollow tube 802 through the apertures and the sleeve 804 onto the rear side of the transfer member 700.

Lubrication roller 800 is positioned so that compressible sleeve 804 contacts the transfer member, and is configured to revolve about its axis. It may revolve correspondingly to the movement of the transfer member (e.g., by being driven by friction with the transfer member) or it may revolve independently of the movement of the transfer member so that the surface of sleeve slides over the rear surface of the transfer member. In some embodiments, the lubrication roller 800 may revolve in the opposite direction to the direction determined by the movement of the transfer member.

In operation, the hollow tube 802 may be substantially filled with lubricant 730 and lubricant 730 may correspondingly drip through the apertures of the hollow tube 802 and through compressible sleeve 804 to be smeared on the rear surface of the transfer member. According to some embodiments lubricant 730 may be pressurized through the apertures, e.g., by a pump, and according to some embodiments the transparent lubricant drips through the apertures through gravitational force.

In FIG. 5b there are no guide rollers, and the transfer member slides instead over rounded corners 810a and 810b of a construction 812 that lie upstream and downstream of the compressible element 708, respectively. Construction 812 may be employed in some embodiments to secure the imaging system 16 to the compressible element 708. A hollow passage 820 in construction 812 may be in fluid communication with a lubricant reservoir (not shown here) and a lubricant 730 may escape through multiple of apertures in the wall of the passage 820 onto the external surface of the construction 812 over which the transfer member 700 slides. Hollow passage 820 is advantageously positioned upstream of the compressible element 708 and even upstream of rounded corner 810a, so that in operation lubricant 730 is applied to the transfer member just upstream to the point where the transfer member slides over the rounded corner 810a.

Lubricant 730 is configured to lubricate and facilitate the sliding of the transfer member over the compressible element 708 without interfering, or at least with minimal interference with the optical path of radiation from imaging system 16 towards the impression cylinder 22 through the compressible element 708. While the lubrication systems have been illustrated in a system wherein the rear side of the transfer member is contacted by a compressible element 708, the same principles apply to printing systems alternatively using a separate pressure applicator 90, the rear side of the transfer member being then in contact with segments 92 and optionally 94.

Regardless of the specific architecture of the printing system in the region spanning from the imaging system 16 to the rear side (e.g., a support layer 710) of the transfer member 700, the lubricant 730 may, in some embodiments, be a liquid having a relatively low viscosity to further reduce friction between the transfer member 700 and any element contacting its rear side. A lubricant having a relatively low viscosity may have a dynamic viscosity of 400 mPA·s or less, 300 mPA·s or less, 200 mPA·s or less, or 150 mPA·s or less. Usually, low viscosity lubricants have a dynamic viscosity of 1 mPA·s or more, 10 mPA·s or more, 20 mPA·s or more, 30 mPA·s or more, or 50 mPA·s or more. In some embodiments the viscosity of the lubricant lies within the range of 30-400 mPa·S. More preferably, the viscosity may lie within the range of 50-300 mPa·S. While such values are of greater relevance to the operating temperature of the printing system, and more specifically to the temperature the lubricant between the transfer member 700 and the element(s) (e.g., 708; or 92 and/or 94) contacting its rear side, a suitable lubricant can be selected when such viscosity values are measured at about room temperature (circa 23° C.) with an appropriate viscometer. The shear rate experiences by the lubricant during operation of the printing system, inter alia as a result of the velocity of the transfer member, may also affect the range of suitable viscosities, as readily appreciated by a skilled person.

It is to be noted that the viscosity alone may not suffice to elect a particular lubricant, as the relative polarity of the surfaces to be lubricated and of the lubricant may also contribute to a desired level of lubrication (in other words, reducing friction between the sliding and static parts). For instance, comparing lubricants having similar viscosities, semi-polar ones (e.g., silicone polyethers, such as Silsurf® A004-UP and Silsurf® C208; silicone glycol copolymers, such as Silsurf® C208; and fluorinated silicones, such as Fluorosil® 2110; all supplied by Siltech Corporation) may be preferable over less polar or non-polar counterparts of the same families, but having a lower amount of polar moieties (e.g., silicone glycol copolymers, such as DMS-T21; and fluorinated silicones, such as DMS-T22; all supplied by Gelest®). Polar lubricants (e.g., ethylene glycol, propylene glycol and polymers of the same) may display a lubrication potency of intermediate degree between less potent non-polar silicone oils and more potent semi-polar silicone oils. In some embodiments, water may also serve as a polar lubricant.

In some embodiments, lubricant 730 may be a non-swelling liquid with respect to the surfaces that lubricant 730 may contact in operation. For instance, a non-swelling lubricant does not significantly modify the shape and/or the weight of a support layer 710, a compressible element 708, a compressible segment 92 of a pressure applicator 90, and/or a segment 94, as the case may be. The ability of a liquid (e.g., a lubricant) to swell any part or material can be assessed by dipping the part or material under study in the candidate liquid for a predetermined duration (e.g., 24 hours) and by measuring (after having wiped excess liquid) the difference in weight, if any, before and after incubation of the tested part or material in the candidate liquid. A liquid yielding substantially no change in weight of the incubated part or material is considered non-swelling with respect to said part or material. A weight after incubation in a liquid having a deviation from the original weight (before incubation) within ±5% is considered substantially identical to the original weight, the liquid being therefore deemed "non-swelling". In some embodiments, the deviation from original weight after 24 hours of incubation with the non-swelling lubricant is 4% or less, 3% or less, 2% or less, or 1% or less. Swelling, or lack thereof, may be similarly assessed by changes in volume of the tested part or material in the candidate liquid. The ability of a lubricant to swell or not swell a particular part or material it may contact in the printing process can be assessed at the intended operating temperature.

It is to be noted that a lubricant having a relatively low molecular weight can more easily penetrate a polymer matrix than a lubricant having a relatively high molecular weight, a low molecular weight lubricant having therefore increased probability of swelling a matrix. However, molecular weight is not the sole parameter indicative of the ability of a lubricant to swell or not swell a particular material by penetrating underneath its surface and the relative polarity of the contacted matters may also play a role. Non-polar lubricants may swell surfaces deemed non swellable by semi-polar or polar lubricants. Without wishing to be bound by any particular theory, the Inventors have observed that the ability to swell transfer member 700 is inversely proportional to the polarity of the lubricant.

In some embodiments, lubricant 730 may additionally or alternatively be a non-wetting liquid with respect to the surfaces that lubricant 730 may contact in operation. For instance, a non-wetting lubricant does not spread on a support layer 710, a compressible element 708, a compressible segment 92 of a pressure applicator 90, and/or a segment 94, as the case may be, but bead thereon. The ability of a liquid (e.g., a lubricant) to wet any part or material can be assessed by depositing a droplet of the candidate liquid on the surface of the part or material under study and observing the behavior of the droplet. This ability can be further assessed by measuring the contact angle formed by the droplet on the surface. If desired, the tendency of a liquid to wet, or not wet, a particular surface can also be estimated by measuring the respective surface tension and surface energy of the materials contacting one another. A liquid beading on a surface of a part or material is considered non-wetting with respect to said part or material.

In any configuration of the printing system, lubricant 730 is advantageously transparent, and has the same or similar refractive index as the transparent transfer member 700 and/or the refractive index of the compressible element 708 of an imaging station 16 or of segment 94 of an imaging station 16', to minimize reflections at the interface between the compressible element (or any other element in the optical path) and the transfer member.

According to some embodiments lubricant 730 is selected to be a transparent glycol or polyether, selected from a group comprising ethylene glycol (EG), polyethylene glycol (PEG), propylene glycol (PG) and polypropylene glycol (PPG). An EG, PEG, PG or PPG transparent lubricant is inert with respect to the polymeric matrix of the compressible element 708, or of any other element it may contact (e.g., segment 92 and/or segment 94), and/or of the transfer member 700 (in particular, with respect to the layer on the rear side of the transfer member, e.g., support layer 710). By inert, it is meant in the present context, that the lubricant is non-swelling and non-wetting of the surfaces that the lubricant may contact in operation. In some embodiments, the EG, PEG, PG or PPG lubricant has a relatively low viscosity. In such embodiments, the EG, PEG, PG or PPG lubricant may have an average molecular weight of 600 or less, 500 or less, or 400 or less. EG, PEG, PG or PPG, when used as lubricant 730 according to some embodiments of the present teachings may have an average molecular weight of 40 or more, 60 or more, or 80 or more. In some embodiments, the lubricant 730 is ethylene glycol (EG) or a PEG polymer selected from a group comprising PEG-200, PEG-300, and PEG-400. In some embodiments, lubricant 730 is propylene glycol (PG) or a PPG polymer selected from a group comprising PPG-Mn~425, PPG-P400, PPG-P1200, and PPG-2000.

According to some embodiments lubricant 730 is selected to be a transparent silicone oil compatible with the silicone matrix of the compressible element 708 and/or the silicone matrix of the transfer member 700. By compatible, it is meant in the present context that the lubricant, while being non-wetting, may to some extent swell the matrix of the compressible element 708 and/or of the transfer member 700, so as to achieve, if desired, a particular effect to be detailed in the following. The lubricant typically has a surface tension higher than the surface energy of the transfer member and different than the surface energy of the compressible element. The lubricant, if and when sweating out of a silicone matrix should preferably bead on the surface of at least one of the two surfaces the oil is due to lubricate.

According to some embodiments, the silicone oil is further adapted to penetrate through the transfer member so as to replenish the content of silicone oils that may exude on the imaging surface during operation. Without wishing to be bound by any particular theory, it is believed that the oil constituents that may be released from a cured matrix with time can form a thin film upon the imaging surface and enhance release of tacky particles or film onto the substrate at the transfer station as described above. In such embodiments the use of a suitable silicone oil as a lubricant on the rear side of the transfer member may prolong the useful life expectancy of the transfer member, because, in contrast to spontaneous release of silicone oils from a silicone matrix, which may diminish and even end over time, the added lubricant is supplied incessantly during operation. The viscosity of the silicone oil may be selected in accordance with the permeability of the silicone matrix of the transfer member and with the total thickness thereof, to obtain sufficient penetration of the silicone oil through the transfer member, yet to avoid swelling of the transfer member to an extent that may affect the imaging surface uniformity, hence print quality. Similarly, the molecular weight of the silicone oil may be small enough to allow diffusion through the transfer member, yet sufficiently high to control the rate of diffusion. Generally, the amount of silicone oil that may be desorbed from an elastomeric matrix is sufficiently high to provide the desired release of the image, yet sufficiently low, so as to avoid any significant transfer to the printing substrate. A lubricant, which in a particular embodiment, facilitates the release of the ink image from the transfer member to the printing substrate is considered "a release enhancing aid".

The silicone oil that may serve as transparent lubricant can be relatively polar as compared to the silicone matrix to be "replenished" therewith. The transparent lubricant can be selected from polyether silicone oils and amino-silicone oils. Non-limiting examples of suitable silicone oils include Silsurf® A004-UP and Silsurf® C208, polyether silicones commercialized by Siltech Corporation, and GP-4, an amino-silicone oil commercialized by Genesee Polymers Corporation.

Figure 9:
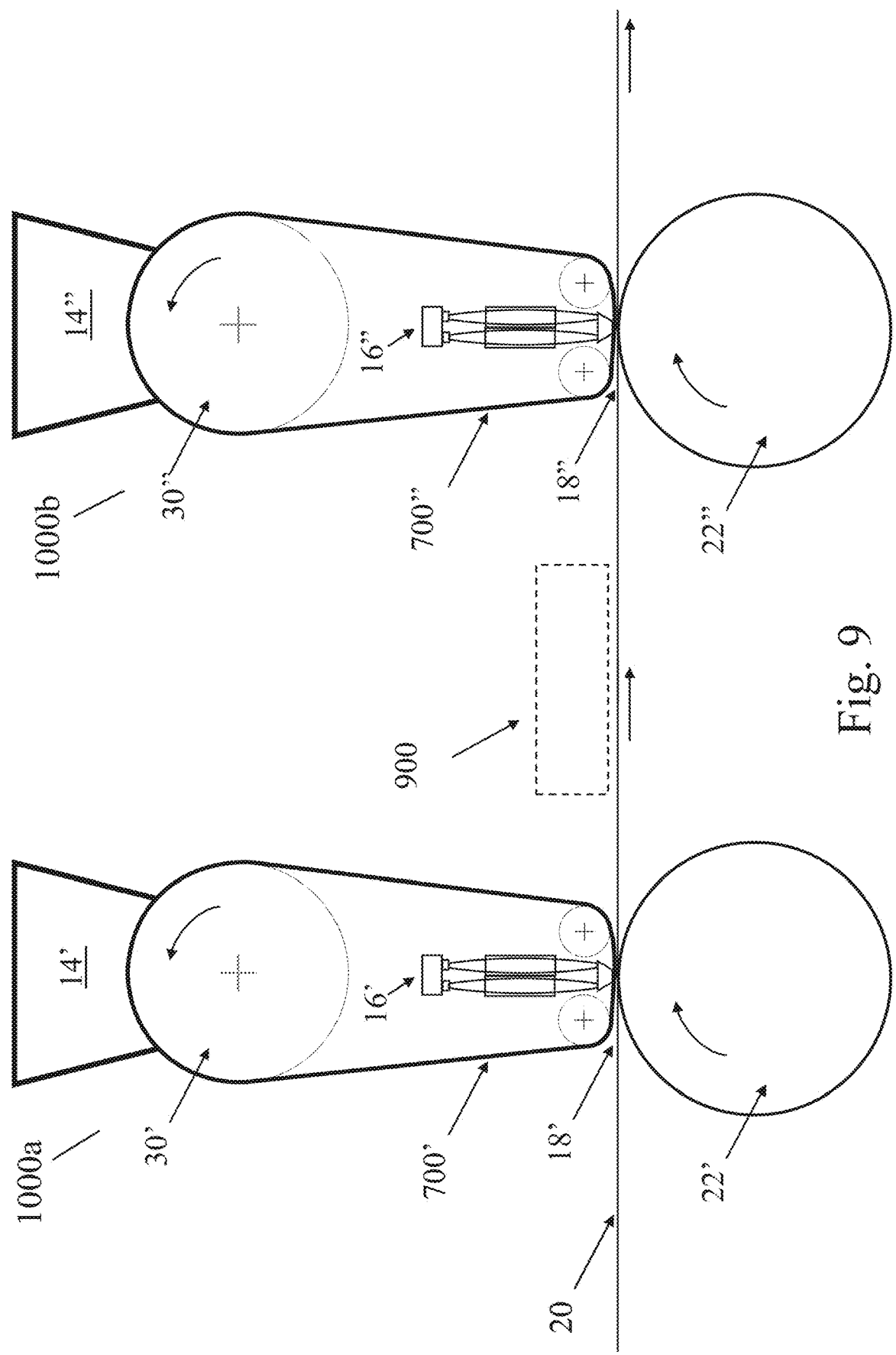
FIG. 9 is a view of an alternative embodiment of a printing assembly in which images can be sequentially applied on a same substrate

The digital printing system shown in FIGS. 3a and 4 can only print in one color but multicolor printing can be achieved by passing the same substrate successively through multiple arrangements of printing systems, such as those herein disclosed consisting of coating, imaging and transfer stations, that are synchronized and/or in registration with one another and each printing a different color. Such a printing assembly, including at least one printing system according to the present teachings, is schematically depicted in FIG. 9. In such embodiments it may be desirable to provide substrate treating stations between the different coating stations (such a treating station 900 is schematically represented in FIG. 9). A treating station can be, for instance, a cooler able to reduce the temperature of the substrate on its exit of a previous transfer station. While FIG. 9 illustrates an arrangement including two printing systems 1000a and 1000b comprising coating stations (14' and 14"), imaging stations (16' and 16") and transfer stations (18' and 18"), this should not be construed as limiting, and a printing system may include any other number of such printing sub-arrangements (e.g., 3, 4, 5, and so on). When considering a printing system being an arrangement of a series of printing systems sub-arrangements, printing on a same substrate, the most upstream transfer station can be referred to as the first transfer station and the most downstream transfer station can be referred to as the last transfer station, which can be a second, third, fourth and so on transfer station. Such arrangement can be alternatively referred to as a printing assembly, each transfer station being of a distinct printing system. While the pair of printing systems illustrated in the printing assembly of FIG. 9 relates to a printing system corresponding to FIG. 3a, the same could be achieved by using a printing system according to FIG. 4 or 8, or combinations of such printing systems as diverse sub-arrangements in a same printing assembly.

As some transferred films may retain some residual tackiness to a degree that may impair a subsequent transfer of different particles, it may be advantageous to eliminate such residual tackiness by cooling of the film transferred to the substrate. Depending on the thermoplastic polymer, the elimination of any residual tackiness, or its reduction to a level not affecting the process, can alternatively be achieved by a treating station being a curing station. This, however, is not essential as retaining tackiness may be desirable for alternative printing assemblies in which a printing system downstream of one according to the present teachings is different, as schematically illustrated in FIGS. 6a and 6b.

Moreover, while in previous paragraphs each printing system (arrangement of coating, imaging and transfer stations) was considered for the sake of printing a different color of thermoplastic particles, in a further embodiment, one set of such printing systems in a printing assembly comprising at least two such printing systems, can be used to apply colorless particles. For instance, the colorless particles can be applied at the final printing system in the assembly. In such a case, the colorless film of tacky thermoplastic particles of the last coating station, exposed to radiation at the last imaging station, are transferred at the transfer station of the last printing system, for instance, to serve as overcoat to the previous colored films. Such a downstream printing system can be said to form an over-coating arrangement or sub-system. Conversely, an arrangement for colorless printing can be the first printing system of a printing assembly, for instance, to modify the later application of colored particles or films, and/or the visual effect they may provide. Such an upstream printing system can be said to form an under-coating arrangement or sub-system.

Furthermore, a printing system, even if monochrome, may include a perfecting system allowing double-sided printing. In some cases, perfecting can be addressed at the level of the substrate transport system 200, which may for example revert a substrate to a side not yet printed on and return the unprinted side of the substrate to the same treating and impressions stations having served to print the first side. In other cases, perfecting can be addressed by including two separate transfer stations (and their respective upstream or downstream stations), each transfer station enabling printing on a different side of the same substrate.

Figure 6A:
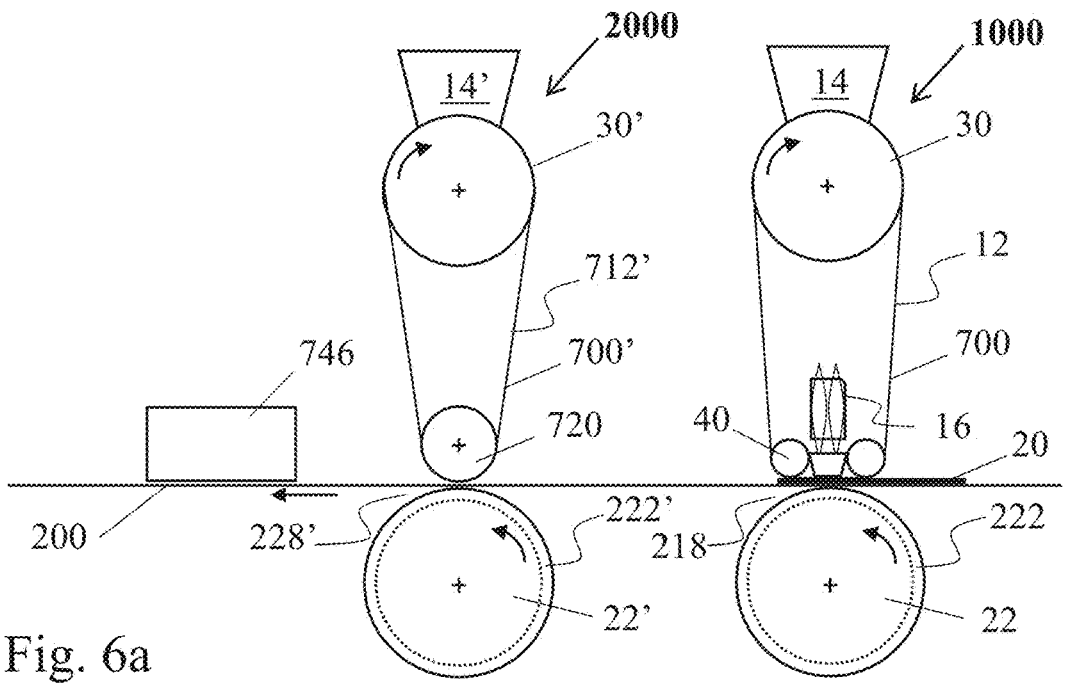
FIGS. 6a and 6b show the printing system of FIG. 3a as part of exemplary printing assemblies in which the substrate is subjected to further processing after passing through the transfer station.
Figure 6B:
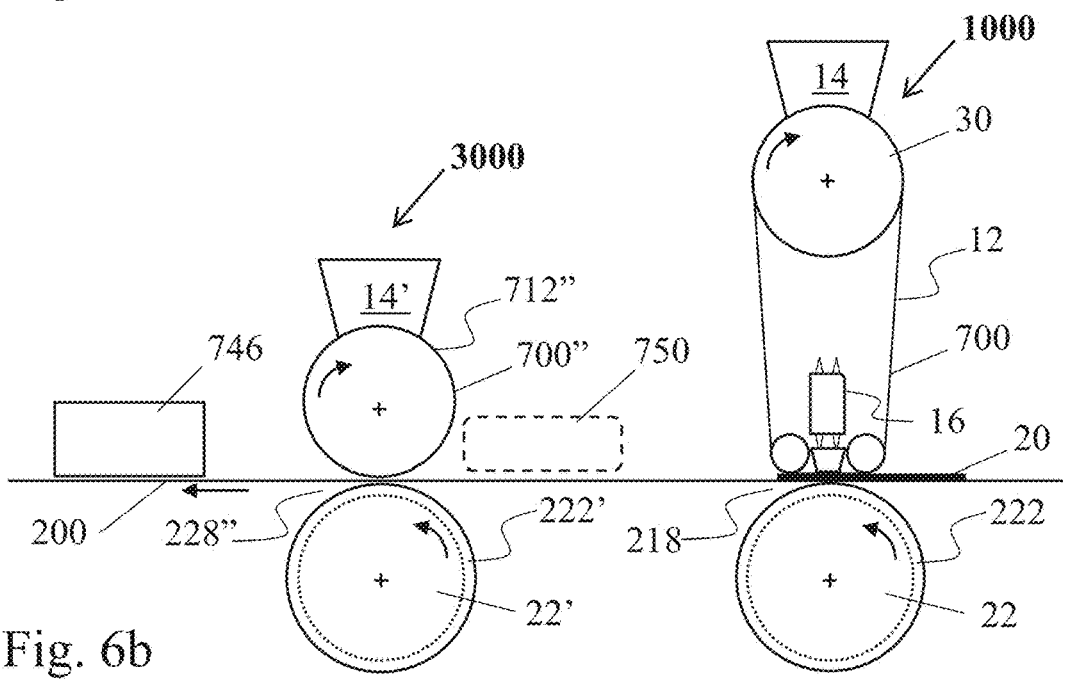

FIG. 6a shows an embodiment in which a first printing system, generally designated 1000, is the same as that illustrated in FIG. 3a. The same reference numerals have been retained to avoid the need for repetition. The first printing system can alternatively be as schematically illustrated in FIGS. 1 and 4. The first transfer station at which the thermoplastic particles can be transferred to the substrate to form an adhesive image is designated 218. In one embodiment, a second printing system 2000 is provided to coat the substrate, or selected regions thereof, with second particles of any desired material and color, which can serve as a varnish or protective or decorative coat. In this printing system 2000, a coating station 14' applies a monolayer of second (e.g., transparent) particles to a transfer member 700' passing over a drum 30'. There is however no selective heating of the particles in the transfer member 700'. Instead, the transfer member 700' is pressed against the substrate 20 conveyed by at substrate transport system 200, and second (e.g., plastic, metallic or ceramic) particles are transferred to the substrate at transfer station 228' either because the polymer film on the substrate applied by the printing system 1000 is still tacky (i.e. sufficiently adhesive to transfer second particles from their transfer member and adhere them to the substrate), or because a pressure roller 720 and/or the impression cylinder 22' is heated, said heating restoring the tackiness of the image transferred at the first printing system and/or non-selectively heating the second particles. For simplicity, an image formed at a first printing system 1000 whose role is to adhere second particles brought into contact therewith at a second printing system (e.g., 2000, 3000) may be referred to as an adhesive image, regardless of any optional need for additional heat once on the printing substrate for it to be sufficiently tacky/adhesive towards the new particles. In the former case, only adhesive image areas of the substrate will have a coating of second particles (e.g., a varnish coating if the second particles are thermoplastic), whereas in the latter case the entire surface of the substrate may receive a transparent coating using such thermoplastic second particles, if non-selectively heated to become sufficiently tacky for transfer.

As previously described for the first printing system wherein the imaging surface 12 can be replenished with thermoplastic particles, the particle receiving surface 712' of the second printing system can similarly be replenished with second particles at the second coating station 14' following transfer of at least part of them to the substrate at a previous cycle. In such way, the particle receiving surface will again be uniformly coated with a monolayer of second particles before coming into contact with a subsequent substrate and adhesive image thereon. While the second particles are typically applied to the receiving surface (e.g., 712', 712") so as entirely coat it, in some embodiments the density of the particles coating the second transfer member 700' or 700" may be controlled by coating station 14' so as to coat only portions of the adhesive image created by the first printing system 1000. For illustration, if metallic particles are applied on the receiving surface of a second transfer member at a relatively low density achieving e.g., 5% area coverage, transfer of said relatively dispersed second particles to an adhesive image may provide for a glittering effect to the previously applied image.

Alternatively, the second printing system can be set to print on only part of (e.g., the width of) the substrate, so that even an entirely coated receiving surface of second particles may transfer to only a part of the adhesive image. For illustration, if the particle receiving surface of the second printing system is offset with respect to the imaging surface of the first printing system or with respect to an adhesive image that can be formed thereby, then the second particles may adhere to only part of the adhesive image, such as in a bottom, central or top portion thereof. A similar effect can alternatively be obtained by selectively heating only a part of the adhesive image to achieve an adhesiveness suitable to detach second particles. For illustration, a heating station upstream of the nip of a second printing system may be shaped or adapted to heat selective areas of the substrate and of an adhesive image formed thereon, yielding for instance stripes of heated areas. In any such event, the second particles are said to adhere to at least a part of the adhesive image.

Particles rendered tacky at printing system 1000, and polymer films thereof subsequently transferred to the substrate, may retain at least some degree of tackiness from the time they are applied on the substrate till it reaches the nip of printing system 2000. This can be achieved by either ensuring that the thermal characteristics of the transfer member and/or the particles are adequate to keep the particles warm enough (i.e. tacky) until said contact is made, or, preferably, by employing thermoplastic particles which have a delayed crystallization characteristic (called "open time" in hot melt adhesive parlance) adequate to retain tackiness and adhesiveness until pressed into contact with the substrate and/or until reaching a second printing system.

FIG. 6a also shows a finishing station 746 where the polymer film may undergo (e.g., thermal) treatment to fix, cure, coat or dry the polymer film applied by printing system 1000 and/or by printing system 2000. If such (e.g., thermal) treatment is accompanied by pressure contact with the polymer film, it may also serve to impart a desired surface finish, such as a gloss, to the surface of the substrate.

In FIG. 6b, the first printing system 1000 may be as previously described for FIG. 6a, this figure illustrating an alternative printing assembly wherein the second printing system is designated 3000. While in FIG. 6a the second particles applied at the second printing system 2000, were applied to the particle receiving surface 712' of a second transfer member 700' shaped as an endless belt, in the printing assembly of FIG. 6b the second particles are applied by the second coating station 14' to the particle receiving surface 712" of a second transfer member 700" shaped as a drum. Drum 700" not only provides the receiving surface to be coated by the second particles, but forms with the impression cylinder 22' the second transfer station 228" and the nip through which a substrate 20 would pass upon exit of the nip of the first transfer station 218 of the first printing system 1000. FIG. 6b illustrates a further alternative for a printing assembly, wherein the adhesive image formed by selective transfer of thermoplastic particles by the first printing system 1000 can be optionally subsequently heated at a heating station 750. Heater of heating station 750 may ensure that the adhesive image remains sufficiently tacky (or regains sufficient tackiness) by the time the substrate enters the second nip. While schematically represented by a box upstream of printing system 3000, the heating elements can additionally or alternatively be positioned at the nip of the second transfer station, impression cylinder 22' containing for illustration an internal heating element or circulating liquid. Regardless of position at which it is directed along the printing path, the applied heat can be selected to render tacky only the adhesive image or portions thereof. In some embodiments, when complete coating of the substrate is not sought, the heat can be configured to be sufficiently low so as to prevent non-selective transfer of thermoplastic second particles to the entire surface of the substrate. Generally, second particles made of materials other than thermoplastic polymers, such as thermosetting plastics, metals, ceramics, glasses and the like, transfer only to the areas of the adhesive images or to selectively heated part(s) thereof.

Elements of the exemplary embodiments of printing assemblies, and sub-systems thereof, separately illustrated in either FIG. 6a or FIG. 6b may be combined in any desired manner. For illustration, a heating station 750 can be present upstream and/or at a second transfer station, wherein the second particles are applied to a second transfer member shaped as an endless belt (e.g., 700'). It should be noted that as the second printing systems illustrated in these figures do not necessarily rely on EM radiation or heat transiting via a rear side of the transfer member to effect transfer of second particles, which moreover would not necessarily be thermoplastic, their transfer members (e.g., 700', 700") need not be transparent to EM radiation. Therefore, while second transfer members of second printing systems can be configured as extensively detailed for transfer member 700, they may be subject to less stringent requirements, as long as they are capable of transiently retaining the second particles and being able to release them once contacted by an adhesive image.

The Substrate

The printing systems and assemblies shown in FIGS. 1, 3a, 4, 6a, 6b, 8 and 9 are not restricted to any particular type of substrate. The substrate may be individual sheets of paper or card or it may have the form of a continuous web. Because of the manner in which a thin film of softened polymeric particles is applied to the substrate, the film tends to reside on the surface of the substrate. This allows printing of high quality to be achieved on paper of indifferent quality. Furthermore, the material of the substrate need not be fibrous and may instead be any type of surface, for example a plastics film or a rigid board.

The Transfer Station

Figure 6C:
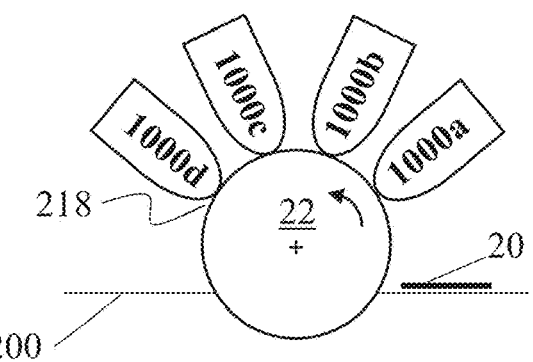
FIG. 6c schematically depicts an alternative embodiment of a printing assembly in which images can be sequentially applied on a same substrate.

The transfer station 18, 18' or 18" illustrated in FIG. 1, 3a, 4, 8 or 9, or the transfer stations 218, 228' and 228" illustrated in FIGS. 6a-6c, have been depicted to comprise only a smooth impression cylinder 22 or 22' that is pressed against the drum 10, or the transfer member 700, 700' or 700", and their outer imaging surface 12 or particle receiving surfaces 712' or 712". The impression cylinder 22 and/or 22' may form part of a substrate transport system 200, in which case it may be equipped with grippers for engaging the leading edge of individual substrate sheets. In other than digital printing systems, the impression cylinder 22 may have an embossed surface to select the regions of the particle coating to be transferred to the substrate 20.

Additional Stations and/or Transfer Members

The printing systems described herein may have additional stations and/or transfer members. For example, a particular printing assembly may further include additional printing systems which may include a second coating station, a second transfer station, and a second transfer member. The second transfer station (e.g., 18" of FIG. 9) may be disposed downstream of the afore-described (first) transfer station (e.g., 18' of FIG. 9) in the path of the substrate. The second coating station (e.g., 14" of FIG. 9) may serve to apply a monolayer coating of different polymeric particles to the second transfer member (e.g., 700" of FIG. 9) that is pressed against the substrate at the second transfer station. For instance, the particles that are applied to the second transfer member may be of a second color or may be transparent. Additionally, or alternatively, the particles applied to the second transfer member may adhere only to regions of the surface of the substrate having a polymer film that was applied at the (first) transfer station and that is still tacky. In embodiments with such additional transfer stations, the finishing station discussed above may apply a thermal treatment to the polymer film that was applied to the substrate at the last of the transfer stations (e.g., after passage through all the transfer stations). While the different transfer stations in a printing assembly comprising more than one printing system have been illustrated in FIGS. 6a-6b and in FIG. 9 as being separately formed with distinct impression cylinders, such arrangement is not mandatory. In an alternative embodiment of a printing assembly, the transfer stations of a plurality of printing systems can be arranged across a same impression cylinder. For illustration, a printing assembly comprising four printing systems, each adapted to thermally transfer thermoplastic particles of a different color, such as cyan, magenta, yellow and black, can be radially positioned along the circumference of a single impression cylinder. This is schematically depicted in FIG. 6c, in which each of 1000a to 1000d can be adapted to transfer thermoplastic particles of a different color. Alternatively, one of 1000b to 1000d can serve as a second printing system (such as detailed for 2000 and 3000) capable of applying second particles to an adhesive image formed by 1000a being a first printing system. For sake of clarity, in-between or finishing stations and optional heaters(s) are omitted from this figure.

In the description and claims of the present disclosure, each of the verbs, "comprise" "include" and "have", and conjugates thereof, are used to indicate that the object or objects of the verb are not necessarily a complete listing of features, members, components, elements, steps or parts of the subject or subjects of the verb.

As used herein, the singular form "a", "an" and "the" include plural references and mean "at least one" or "one or more" unless the context clearly dictates otherwise. At least one of A and B is intended to mean either A or B, and may mean, in some embodiments, A and B.

Positional or motional terms such as "upper", "lower", "right", "left", "bottom", "below", "lowered", "low", "top", "above", "elevated", "high", "vertical", "horizontal", "front", "back", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Unless otherwise stated, when the outer bounds of a range with respect to a feature of an embodiment of the present technology are noted in the disclosure, it should be understood that in the embodiment, the possible values of the feature may include the noted outer bounds as well as values in between the noted outer bounds.

In the disclosure, unless otherwise stated, adjectives such as "substantially", "approximately" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" or "approximately" precedes a numerical value, it is intended to indicate +/−15%, or +/−10%, or even only +/−5%, and in some instances the precise value. Furthermore, unless otherwise stated, the terms (e.g., numbers) used in an embodiment of the present technology, even without such adjectives, should be construed as having tolerances which may depart from the precise meaning of the relevant term but would enable the embodiment or a relevant portion thereof to operate and function as described, and/or as understood by a person skilled in the art.

While this disclosure has been described in terms of certain embodiments and generally associated methods, alterations and permutations of the embodiments and methods will be apparent to those skilled in the art. The present disclosure is to be understood as not limited by the specific embodiments described herein.

To the extent necessary to understand or complete the disclosure of the present invention, all publications, patents, and patent applications mentioned herein, including in particular the applications of the Applicant, are expressly incorporated by reference in their entirety by reference as if fully set forth herein.

Certain marks referenced herein may be common law or registered trademarks of third parties. Use of these marks is by way of example and shall not be construed as descriptive or limit the scope of this disclosure to material associated only with such marks.

The invention claimed is:

1. A printing assembly comprising:
   A] a first printing system operational to effect printing onto a surface of a substrate by thermal transfer, the first printing system comprising:
   a) a transfer member having opposite front and rear sides with an imaging surface on the front side;
   b) a coating station at which a monolayer of first particles made of, or coated with, a thermoplastic polymer is applied to the imaging surface, or at least a segment thereof, the transfer member and the coating station being operationally in relative movement;
   c) an imaging station at which energy in the form of electromagnetic (EM) radiation is applied to selected regions of the imaging surface to render first particles coating the selected regions tacky; and
   d) a transfer station at which the imaging surface of the transfer member and the surface of the substrate, or respective segments thereof, are operationally pressed against each other to cause the first particles that have been rendered tacky to transfer to the surface of the substrate whereby an adhesive image is formed on the substrate;
   wherein the transfer member is formed of a body on the rear side and an EM radiation absorbing layer made of an elastomeric silicone on the front side of the transfer member adjoining the body, the imaging surface being formed on, or as part of, the radiation absorbing layer; and
   B] a second printing system configured to apply second particles;
   the printing assembly further comprising a heating station at which at least a part of the adhesive image on the substrate is heated so that it is tacky at least during the application of the second particles at the second printing system, to cause second particles to adhere to the at least heated part of the adhesive image.

2. The printing assembly of claim 1, wherein the EM radiation applied to the selected regions of the imaging surface is applied to the front side of the transfer member.

3. The printing assembly of claim 1, wherein the EM radiation applied to the selected regions of the imaging surface is applied via the rear side of the transfer member, the body of the transfer member being transparent to the EM radiation.

4. The printing assembly of claim 3, further comprising a lubrication system configured to controllably release a lubricant to the rear side of the transfer member of the first printing system.

5. The printing assembly of claim 3, wherein the transfer station of the first printing system comprises an impression cylinder positioned facing the front side of the transfer member so as to define a nip at which at least a segment of the imaging surface of the transfer member and at least a segment of the surface of the substrate are pressed against each other, and wherein the imaging station is configured and aligned to apply radiation to the rear side of the transfer member at and/or adjacent the nip, so that rendering of the first particles coating the selected regions tacky, and pressing of the imaging surface of the transfer member and the surface of the substrate, or respective segments thereof, against each other, occur substantially concurrently.

6. The printing assembly of claim 5, wherein the imaging station further comprises a transparent member facing the rear side of the transfer member at the nip, the transfer member sliding during operation between the transparent member and the impression cylinder, the applied EM radiation passing through the transparent member.

7. The printing assembly of claim 6, wherein the transparent member is one of: a) a compressible transparent member; b) a non-compressible transparent member, the first printing system further comprising a pressure applicator having a compressible segment in contact with the rear side of the transfer member adjacently to the nip; c) a transparent member including a surface disposed to contact at least in a portion thereof, a portion of the rear side of the transfer member, the surface having one or two rounded edges to facilitate for a lubricant at least one of entry in-between the surface and the rear side and exit from in-between the surface and the rear side; and d) a transparent member including a surface disposed to contact at least in a portion thereof the rear side of the transfer member, the surface having one or more grooves for directing traversal of a lubricant between the surface and the rear side.

8. The printing assembly of claim 1, wherein the coating station is configured to apply a fresh monolayer coating of first particles to the selected regions from which the first particles were previously transferred to the substrate surface to form the adhesive image, to render the imaging surface uniformly coated with a monolayer of first particles.

9. The printing assembly of claim 1, wherein the imaging surface is the outer surface of a drum or of an endless transfer member.

10. The printing assembly of claim 1, wherein the second printing system comprises:
a) a second transfer member having opposite front and rear sides with a particle receiving surface on the front side;
b) a second coating station at which a monolayer of second particles is applied to the particle receiving surface, the second transfer member and the second coating station being operationally in relative movement; and
c) a second transfer station at which the particle receiving surface of the second transfer member and the surface of the substrate, or respective segments thereof, are operationally pressed against each other to cause transfer of the second particles to at least a part of the adhesive image formed on the substrate at the first printing system.

11. The printing assembly of claim 10, wherein the second transfer station of the second printing system comprises a second impression cylinder facing the front side of the second transfer member, the second impression cylinder being positioned so as to define a second nip at which the particle receiving surface of the second transfer member and the surface of the substrate, or respective segments thereof, are pressed against each other, the second impression cylinder being same or different than the impression cylinder of the first printing system.

12. The printing assembly of claim 11, wherein the heating station is disposed at or adjacent to the second nip, the heat being applied to at least a part of the adhesive image at and/or adjacent the second nip, so that heating the adhesive image and pressing of the particle receiving surface of the second transfer member and the surface of the substrate, or respective segments thereof, against each other, occur substantially concurrently.

13. The printing assembly of claim 11, wherein the particle receiving surface of the second transfer member is the outer surface of a) a second drum and the second nip is between the second drum and the second impression cylinder, or b) an endless second transfer member and the second nip is between a pressure roller facing the rear side of the endless second transfer member and the second impression cylinder.

14. The printing assembly of claim 13, wherein the second impression cylinder is different than the impression cylinder of the transfer station of the first printing system, and at least one of the drum, pressure roller and second impression cylinder is capable of heating so as to constitute at least a part of the heating station.

15. The printing assembly of claim 13, wherein at least one of the drum, pressure roller, impression cylinder and second impression cylinder further includes a compressible layer on its outer surface.

16. The printing assembly of claim 10, wherein the second coating station is configured to apply a fresh monolayer coating of second particles to selected regions of the particle receiving surface depleted from second particles previously transferred to at least a part of the adhesive image, to render the particle receiving surface uniformly coated with a monolayer of second particles.

17. The printing assembly of claim 1, comprising at least one of: a) an under-coating arrangement located upstream of the first printing system; b) a cooling station located downstream of the second printing system; c) an over-coating arrangement located downstream of the second printing system; and d) a finishing station located downstream of at least one of the printing systems.

18. The printing assembly of claim 1, wherein a) the first and second particles are colored particles, a color of the first particles being different from a color of the second particles; or b) one of the first and second particles are colored and the other of the first and second particles are transparent.

19. The printing assembly of claim 1, wherein the second particles provide a decorative coating to the adhesive image, the second particles being made of plastics, metals, ceramics or glasses.

20. The printing assembly of claim 1, further comprising a cooler upstream or on the entry side of the coating station and/or a heater on the exit side of the coating station.

* * * * *